US007548510B2

(12) United States Patent
Kim et al.

(10) Patent No.: US 7,548,510 B2
(45) Date of Patent: Jun. 16, 2009

(54) METHOD OF CONSTITUTING AND PROTECTING CONTROL CHANNEL IN IP-BASED NETWORK AND STATUS TRANSITION METHOD THEREFOR

(75) Inventors: Young Hwa Kim, Daejeon (KR); Byung Ho Yae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 596 days.

(21) Appl. No.: 11/264,086

(22) Filed: Oct. 31, 2005

(65) Prior Publication Data

US 2006/0133266 A1    Jun. 22, 2006

(30) Foreign Application Priority Data

Dec. 22, 2004    (KR) ............... 10-2004-0110352

(51) Int. Cl.
*H04L 12/26*    (2006.01)
(52) U.S. Cl. ................. 370/225; 370/242; 370/352; 370/389
(58) Field of Classification Search ............ None
See application file for complete search history.

(56) References Cited

U.S. PATENT DOCUMENTS

| | | | | |
|---|---|---|---|---|
| 6,594,228 | B1 * | 7/2003 | Naidoo et al. | 370/217 |
| 7,161,900 | B2 * | 1/2007 | Tanada | 370/225 |
| 2002/0131424 | A1 * | 9/2002 | Suemura | 370/400 |
| 2003/0189920 | A1 * | 10/2003 | Erami et al. | 370/351 |
| 2004/0062248 | A1 | 4/2004 | Nagarajan et al. | |
| 2004/0109687 | A1 * | 6/2004 | Park et al. | 398/57 |
| 2004/0153700 | A1 * | 8/2004 | Nixon et al. | 714/4 |

FOREIGN PATENT DOCUMENTS

KR    1020040048674 A    6/2004

OTHER PUBLICATIONS

Lang, Jonathan, et al; "Link Management Protocol (LMP)"; Mar. 2002; IETF; draft-ietf-ccamp-lmp-03.txt; pp. 1-69.*
Lang, Jonathan, et al, "Gereralized Multi-Protocol Label Switching (GMPLS) Recovery Functional Specification"; Apr. 2004; IETF; draft-ietf-ccamp-gmpls-recovery-functional-02.txt; pp. 1-22.*
Griffith, David, et al; "An Analysis of Path Recovery Schemes in GMPLS Optical Networks with Various Levels of Pre-Provisioning"; 2003; NIST; pp. 1-12.*
Li, Guangzhi, et al; "Control Plane Design for Reliable Optical Networks"; Feb. 2002; IEEE Communications Magazine; pp. 1-7.*
Rozycki, Pawel, et al; "Failure Detection and Notification in GMPLS Control Plane"; Jun. 2007; IEEE, pp. 1-6.*
Bell Labs Technical Journal 6(2), 153-169 (2002).

\* cited by examiner

*Primary Examiner*—Hong Cho
*Assistant Examiner*—Robert C Scheibel
(74) *Attorney, Agent, or Firm*—Blakely, Sokoloff, Taylor & Zafman LLP

(57) ABSTRACT

Provided is a method of constituting a highly reliable control network in an IP-based network environment and, more particularly, a protocol technology for automatic control channel constitution and protection. The method includes functions of protection group (PG)-1/3 control channel identification, detour control channel identification, an automatic switchover, a forced switchover, a control channel unavailability notice, a protection/switchover properties information inquiry, an Hello, a protocol error notice, and re-transmission. This invention provides a protection mechanism of control channels without additional overhead and with higher level of resilience capability to improve shortcomings of the LMP and MPLS based schemes.

18 Claims, 27 Drawing Sheets

FIG. 6

| 605 | 610 | 615 | 620 | 625 | 630 | 635 | 640 600 |
|---|---|---|---|---|---|---|---|
| Local CC | Remote CC | Detour CC | Media | CC Type | PG/PPG/PCC | A-Node | CC Status |
| | | | | | | | |
| | | | | | | | |
| | | | | | | | |

FIG. 8

| STATES | DEFINITIONS |
|---|---|
| DOWN | SAME TO THE LMP SPECIFICATION |
| READY | STATE FOR EXCHANGING HELLO INTERVALS AND PROTECTION ATTRIBUTES, AND FOR IDENTIFYING ACTIVE AND STANDBY CONTROL CHANNELS |
| ACTIVE | SAME TO THE LMP SPECIFICATION, ADDITIONALLY STATE THAT AN ACTIVE CONTROL CHANNEL IS DESIGNATED |
| STANDBY | STATE THAT A CONTROL CHANNEL IS WAITING FOR CONVERTING INTO AN ACTIVE CONTROL CHANNEL |
| SOWAITING | STATE THAT A CONTROL CHANNEL IS WAITING FOR A RESPONSE TO SWITCHOVER REQUEST FOR BEING AN ACTIVE CONTROL CHANNEL |
| UP | SAME TO THE LMP SPECIFICATION, ADDITIONALLY STATE THAT CONTROL PACKETS CAN BE EXCHANGED, AND A SWITCHOVER CAN OCCUR |
| GOING DOWN | SAME TO THE LMP SPECIFICATION |

FIG. 9A

| NAME | DEFINITION |
|---|---|
| evAdminDown (1) | REFER TO THE LMP SPECIFICATION |
| evBringUp (2) | REFER TO THE LMP SPECIFICATION |
| evCCDn (3) | REFER TO THE LMP SPECIFICATION |
| evConf (4) | EVENT INDICATING THAT CONFIG HAS BEEN RECEIVED FROM A REMOTE NODE |
| evConfDone (5) | REFER TO THE LMP SPECIFICATION |
| evConfErr (6) | REFER TO THE LMP SPECIFICATION |
| evConfRetTimer (7) | REFER TO THE LMP SPECIFICATION |
| evDCConf (8) | EVENT INDICATING THAT DCCONFIG HAS BEEN RECEIVED FROM A REMOTE NODE |
| evDCConfDone (9) | EVENT INDICATING THAT DCCONFIGACK HAS BEEN RECEIVED FROM A REMOTE NODE |
| evDCConfErr (10) | EVENT INDICATING THAT DCCONFIGNACK HAS BEEN RECEIVED FROM A REMOTE NODE |
| evDCConfTimer (11) | EVENT INDICATING THAT A TIMER FOR STARTING DCC CONFIGURATION HAS EXPIRED |
| evDCConf2Timer (12) | EVENT INDICATING THAT A TIMER FOR WAITING DCC CONFIGURATION HAS EXPIRED |
| evDownTimer (13) | REFER TO THE LMP SPECIFICATION |
| evHelloRcvd (14) | REFER TO THE LMP SPECIFICATION |
| evHelloRetTimer (15) | REFER TO EVHELLO OF THE LMP SPECIFICATION |
| evHoldTimer (16) | REFER TO THE LMP SPECIFICATION |
| evInqry (17) | EVENT INDICATING THAT SAINQRY HAS BEEN RECEIVED FROM A REMOTE NODE |
| evInqryDone (18) | EVENT INDICATING THAT SAINQRYACK HAS BEEN RECEIVED FROM A REMOTE NODE |
| evInqryErr (19) | EVENT INDICATING THAT SAINQRYNACK HAS BEEN RECEIVED FROM A REMOTE NODE |
| evInqryReq (20) | EVENT INDICATING THAT A LOCAL USER HOPES TO IDENTIFY SWITCHOVER ATTRIBUTES OF AN ACC FROM THE REMOTE |
| evNbrGoesDn (21) | REFER TO THE LMP SPECIFICATION |
| evNoti (22) | EVENT INDICATING THAT NOTIFY HAS BEEN RECEIVEDDE A REMOTE NODE |

FIG. 9B

| NAME | DEFINITION |
|---|---|
| evNotiReq (23) | EVENT INDICATING THAT NOTIFY HAS TO BE ISSUED TO A REMOTE NODE |
| evNWTimer (24) | EVENT INDICATING THAT A NEGOTIATION-WAITING TIMER HAS EXPIRED |
| evProtErr (25) | EVENT INDICATING THAT PROTERROR HAS BEEN RECEIVED FROM A REMOTE NODE |
| evProtErrOccurred (26) | EVENT INDICATING THAT A PROTOCOL ERROR HAS OCCURRED |
| evSeqNumErr (27) | REFER TO THE LMP SPECIFICATION |
| evSo (28) | EVENT INDICATING THAT SWITCHOVER HAS BEEN RECEIVED FROM A REMOTE NODE |
| evSoCompleted (29) | EVENT INDICATING THAT SWITCHOVER HAS PERFORMED SUCCESSFULLY DUE TO CC DOWN OR OPERATOR REQUEST |
| evSoDone (30) | EVENT INDICATING THAT SWITCHOVERACK HAS BEEN RECEIVED FROM A REMOTE NODE |
| evSoErr (31) | EVENT INDICATING THAT SWITCHOVERNACK HAS BEEN RECEIVED FROM A REMOTE NODE |
| evSoReq (32) | EVENT INDICATING THAT SWITCHOVER HAS TO BE PERFORMED VIA INTERVENTION OF AN OPERATOR, OR DUE TO ACC'S DOWN |
| evSoTimer (33) | EVENT INDICATING THAT A SWITCHOVER TIMER HAS EXPIRED |

FIG. 11A

| NAME | USAGE | STATUS TO LMP |
|---|---|---|
| Config | REQUEST ABOUT THE CONFIGURATION OF A PG-1/3 CONTROL CHANNEL | EXPANDED |
| ConfigAck | AGREEMENT ABOUT THE CONFIGURATION REQUEST OF A PG-1/3 CONTROL CHANNEL | EXPANDED |
| ConfigNack | REJECTION ABOUT THE CONFIGURATION REQUEST OF A PG-1/3 CONTROL CHANNEL | EXPANDED |
| DCConfig | REQUEST ABOUT THE CONFIGURATION OF DETOUR ROUTE | NEW |
| DCConfigAck | AGREEMENT ABOUT THE CONFIGURATION REQUEST OF DETOUR ROUTE | NEW |
| DCConfigNack | REJECTION ABOUT THE CONFIGURATIONTE REQUEST OF DETOUR ROUTE NEW | NEW |
| Hello | SUPPORT OF FAST KEEP-ALIVE MECHANISM NOT CHANGED | NOT CHANGED |
| Notify | IDENTIFICATION OF THE NON-EXISTENCE OF CONTROL CHANNELS AVAILABLE | NEW |
| ProtError | NOTIFICATION OF A PROTOCOL ERROR | NEW |
| SAInqry | REQUEST OF THE SWITCHOVER ATTRIBUTES | NEW |
| SAInqryAck | AGREEMENT ABOUT THE REQUEST OF SWITCHOVER ATTRIBUTES NEW | NEW |
| SAInqryNack | REJECTION ABOUT THE REQUEST OF SWITCHOVER ATTRIBUTES | NEW |
| Switchover | REQUEST ABOUT THE SWITCHOVER | NEW |
| SwitchoverAck | AGREEMENT ABOUT THE SWITCHOVER REQUEST | NEW |
| SwitchoverNack | REJECTION ABOUT THE SWITCHOVER REQUEST | NEW |

FIG. 11B

| OBJECT NAME | USAGE | STATUS TO LMP |
|---|---|---|
| ADDL_INFO_INDICATOR | ADDL_INFO_INDICATOR ADDITIONAL CAPABILITY TO BE SUPPORTED | NEW |
| CC_TYPE TYPE | CC_TYPE TYPE OF CONTROL CHANNEL | NEW |
| CCID | CCID CONTROL CHANNEL IDENTIFIER | NOT CHANGED |
| CONFIG | CONFIG HELLO TIME-INTERVAL | NOT CHANGED |
| HELLO | HELLO SENDING AND RECEIVING SEQUENCE NUMBERS | NOT CHANGED |
| MESSAGE_ID | MESSAGE_ID MESSAGE IDENTIFIER | NOT CHANGED |
| NODE_ID | NODE_ID NODE IDENTIFIER | NOT CHANGED |
| PROT_ERROR | PROT_ERROR CODE-POINTS OF A PROTOCOL ERROR | NEW |
| REJECT_CAUSE | REJECT_CAUSE CAUSE OF REJECTION | NEW |
| SEQUENCE_NUMBER | SEQUENCE_NUMBER IDENTIFICATION OF MESSAGE DUPLICATION | NEW |
| SWITCHOVER_ATTR | SWITCHOVER_ATTR ATTRIBUTE OF PROTECTION AND SWITCHOVER | NEW |
| SWITCHOVER_TYPE | SWITCHOVER_TYPE TYPE OF PROTECTION AND SWITCHOVER | NEW |

METHOD OF CONSTITUTING AND PROTECTING CONTROL CHANNEL IN IP-BASED NETWORK AND STATUS TRANSITION METHOD THEREFOR

BACKGROUND OF THE INVENTION

This application claims the benefit of Korean Patent Application No. 10-2004-0110352, filed on Dec. 22, 2004 in the Korean Intellectual Property Office, the disclosure of which is incorporated herein in its entirety by reference.

1. Field of the Invention

The present invention relates to a method of constituting and protecting control channels, and particularly, to a method of constituting and protecting control channels in for constituting a highly reliable control network IP-based networks.

2. Description of the Related Art

Best-effort based IP networks use routing protocols such as OSPF and BGP in order to forward data packets. In this situation, control packets generated by routing protocols are processed in the layer 3 as the same way that data packets exchanged by ordinary users are done in the layer. It means that channels carrying data and control packets share the fate. MPLS based IP networks developed from the best-effort based IP networks use routing and signaling protocols to establish LSPs that are determined for more effectively forwarding data packets. However, their control packets are still processed in the layer 3, and the fate of control channels is the same to that of data channels as well.

Then, GMPLS based IP networks come to be capable of handling control channels separated from data channels. It means that channels carrying data and control packets have an impact upon each other. Several control channels such as SONET/SDH DCC channels and Ethernet OAM channels defined by the OIF, MPLS based LSPs as dedicated control channels, public IP networks, out-of-fiber based dedicated control channels, and so on can be configured independent from data channels for the purpose.

Putting the trend together, a node can keep control channels of sharing and separated fate simultaneously, and a network can provide the protection function of various levels based on configuration schemes of paths to be used to exchange control packets between adjacent nodes. For examples, the IETF configure and manage control channels using the LMP protocol as a typical protocol in GMPLS. But, this protocol uses paths over direct-connected interfaces between nodes or over out-of-fiber based control channels. It means that the protocol does not use a detour route over indirect-connected interfaces between nodes. The MPLS based method uses two MPLS LSPs as dedicated control channels to send control packets over them at the same time. Then, a receiving side takes first-arrived packets and discards late-arrived packets. But, it is difficult to apply this scheme to all network elements within a network, and the scheme has a disadvantage that traffic of control packets increase in double.

SUMMARY OF THE INVENTION

This present invention provides a protection mechanism of control channels without additional overhead and with higher level of resilience capability to improve shortcomings of the LMP and MPLS based schemes. The present invention uses the current LMP as a basis and applies to the scheme the concept of common channel signaling (e.g., to configure various paths to exchange control packets between adjacent nodes using associated, quasi-associated and non-associated modes defined by ITU-T).

According to an aspect of the present invention, there is provided a method of constituting and protecting a control channel in an IP-based network, the method comprising: (a) allowing two adjacent nodes to configure the communication environment of PG-1 and PG-3 control channels, and to identify active and standby control channels between two adjacent nodes; (b) to configure a more powerful control network after the identification of PG-1 and PG-3 control channels, establishing a detour route using PG-1 or PG-3 control channels over one or more transit nodes between adjacent nodes; (c) when a failure on the ACC in use occurs, a switchover to a control channel that first responds to the switchover request.

According to an another aspect of the present invention, there is provided a status transition method for constituting and protecting a control channel, the method comprising: (a) transmitting a control channel identification message in the Down state that is an initial status and transiting to the Ready state; (b) receiving a response message in response to the control channel identification message, transmitting one or more hello messages in the Ready state and transiting to the Active state for designating an ACC; (c) receiving one hello message in the Active state and transiting to the Up state for exchanging control packets for exchanging control according to a protection/switchover function and the type of the control channel based on the response message; and (d) when an event that the control channel is no longer available in the Active state or the Up state occurs, transmitting one or more switchover messages to possible all SCCs and transiting to the Down state.

BRIEF DESCRIPTION OF THE DRAWINGS

The above features and advantages of the present invention will become more apparent by describing in detail exemplary embodiments thereof with reference to the attached drawings in which:

FIG. 6 illustrates a protection/switchover table applied for constituting/protecting the automatic control channel according to an embodiment of the present invention;

FIG. 8 illustrates status definition of the protocol for constituting/protecting the automatic control channel according to an embodiment of the present invention;

FIGS. 9A and 9B illustrate the definition of events used for the protocol for constituting/protecting the automatic control channel according to an embodiment of the present invention;

FIGS. 11A and 11B illustrates the definition of messages and objects used to support the protocol for constituting/ protecting the automatic control channel between two neighborhood nodes according to an embodiment of the present invention;

Figure 12A:
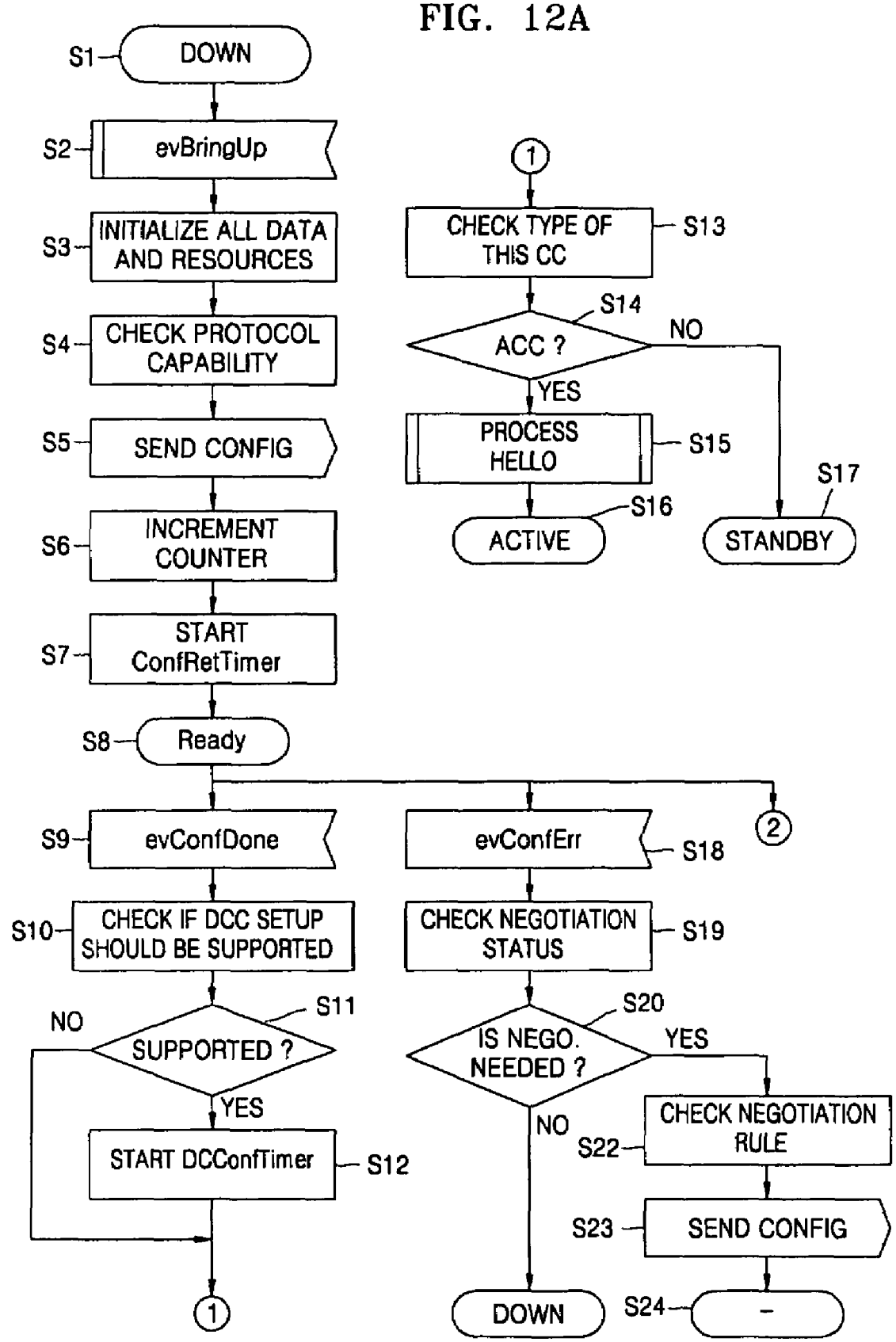
Figure 12B:
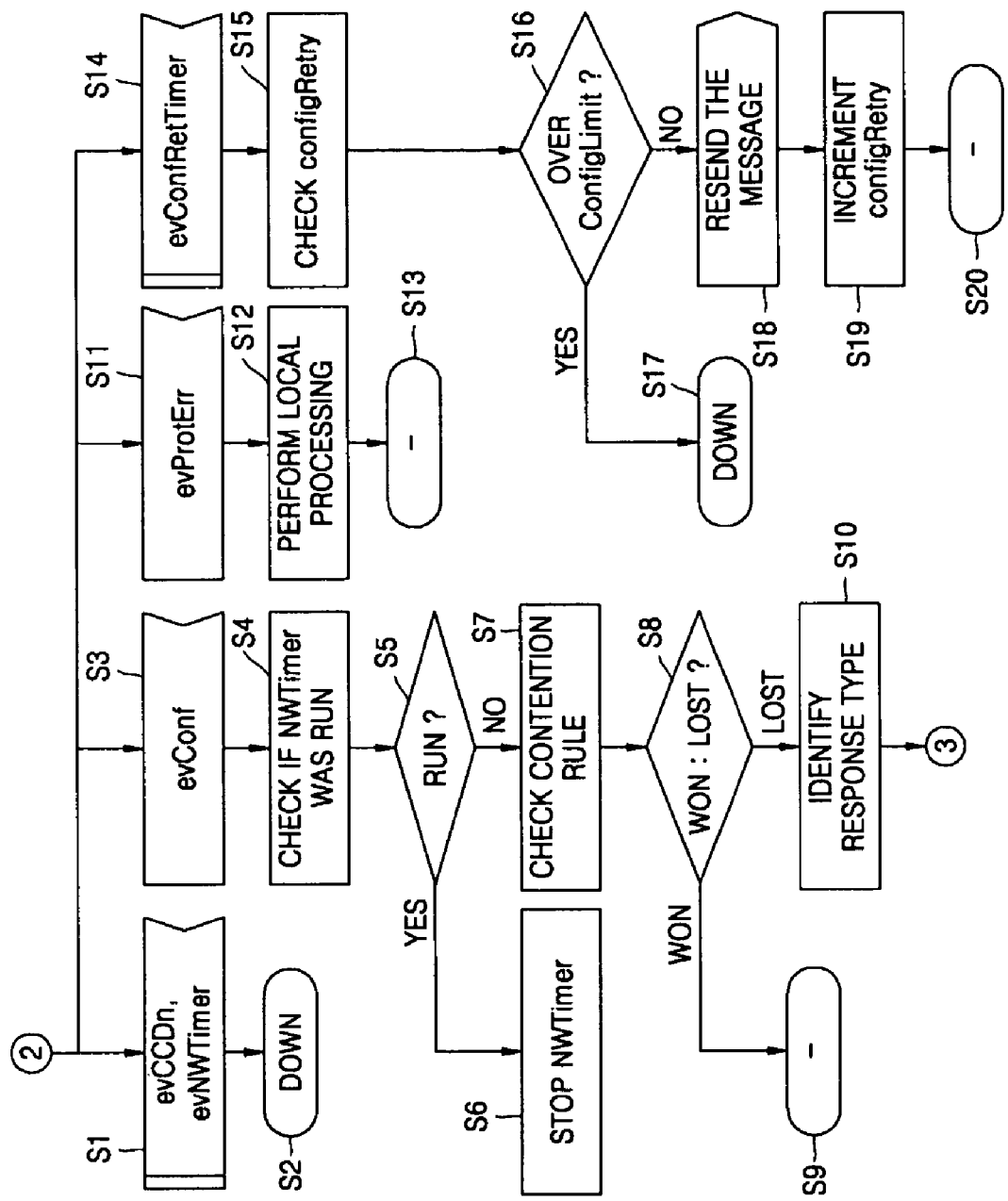
Figure 12C:
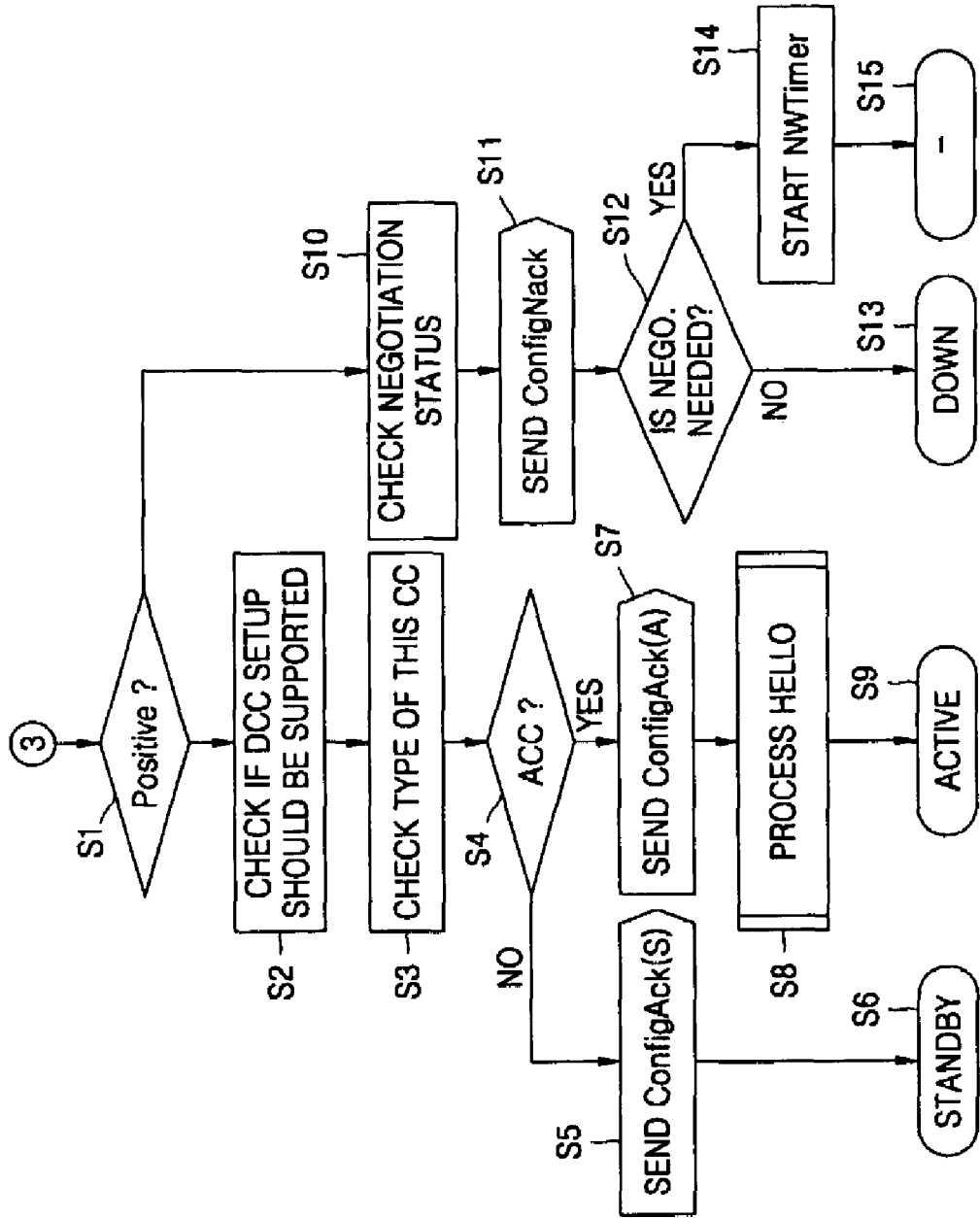
Figure 13A:
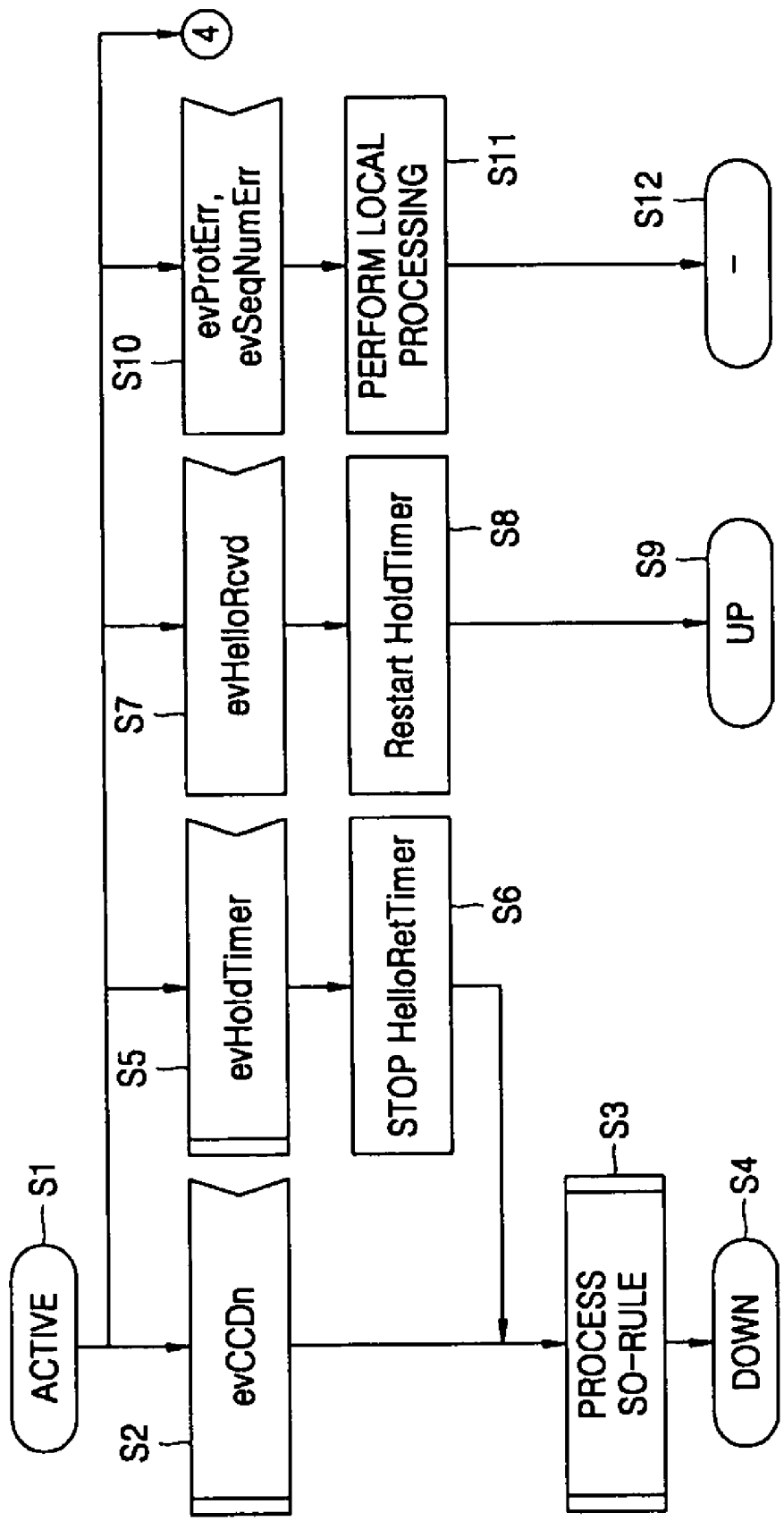
Figure 13B:
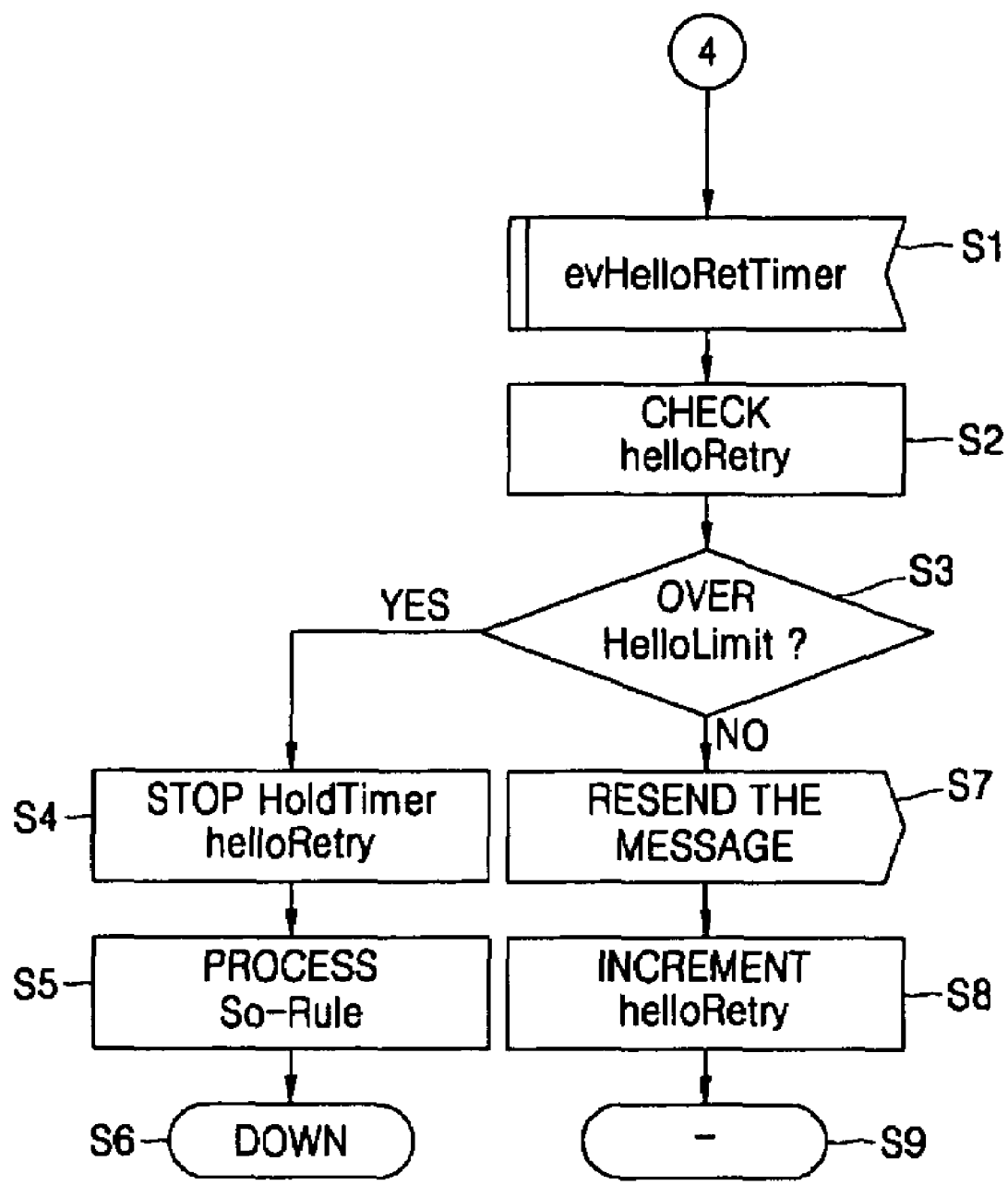
Figure 14A:
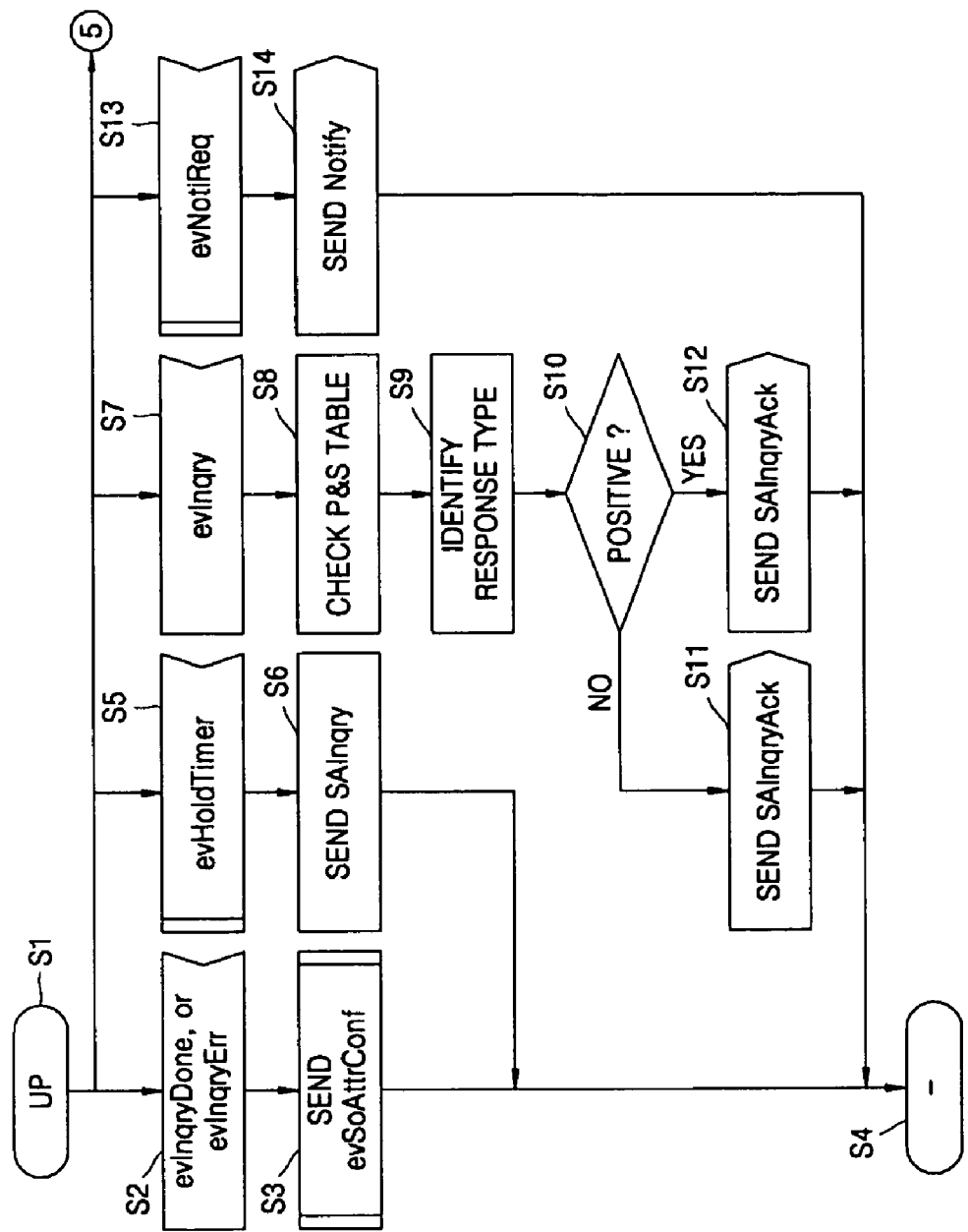
Figure 15:
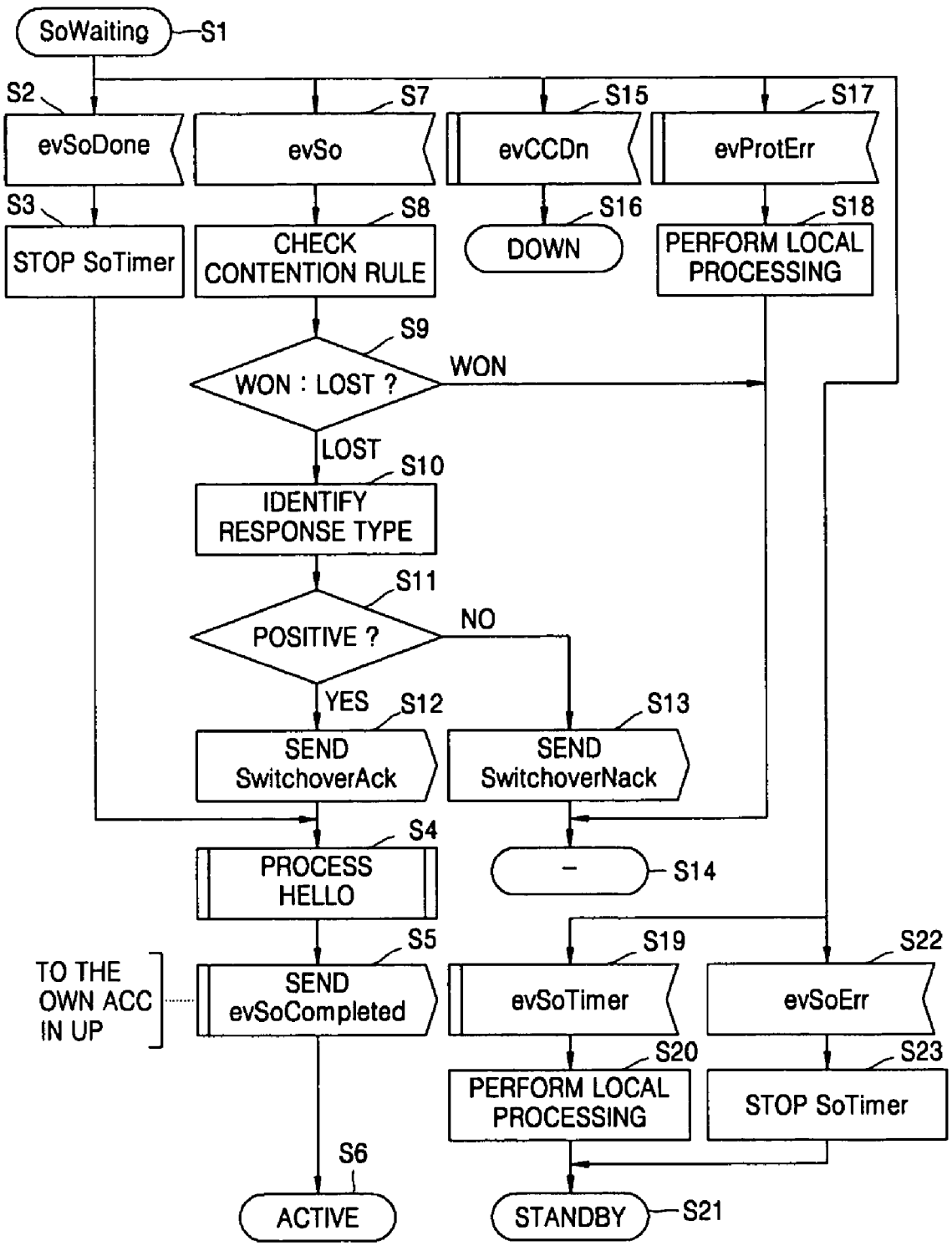
Figure 16:
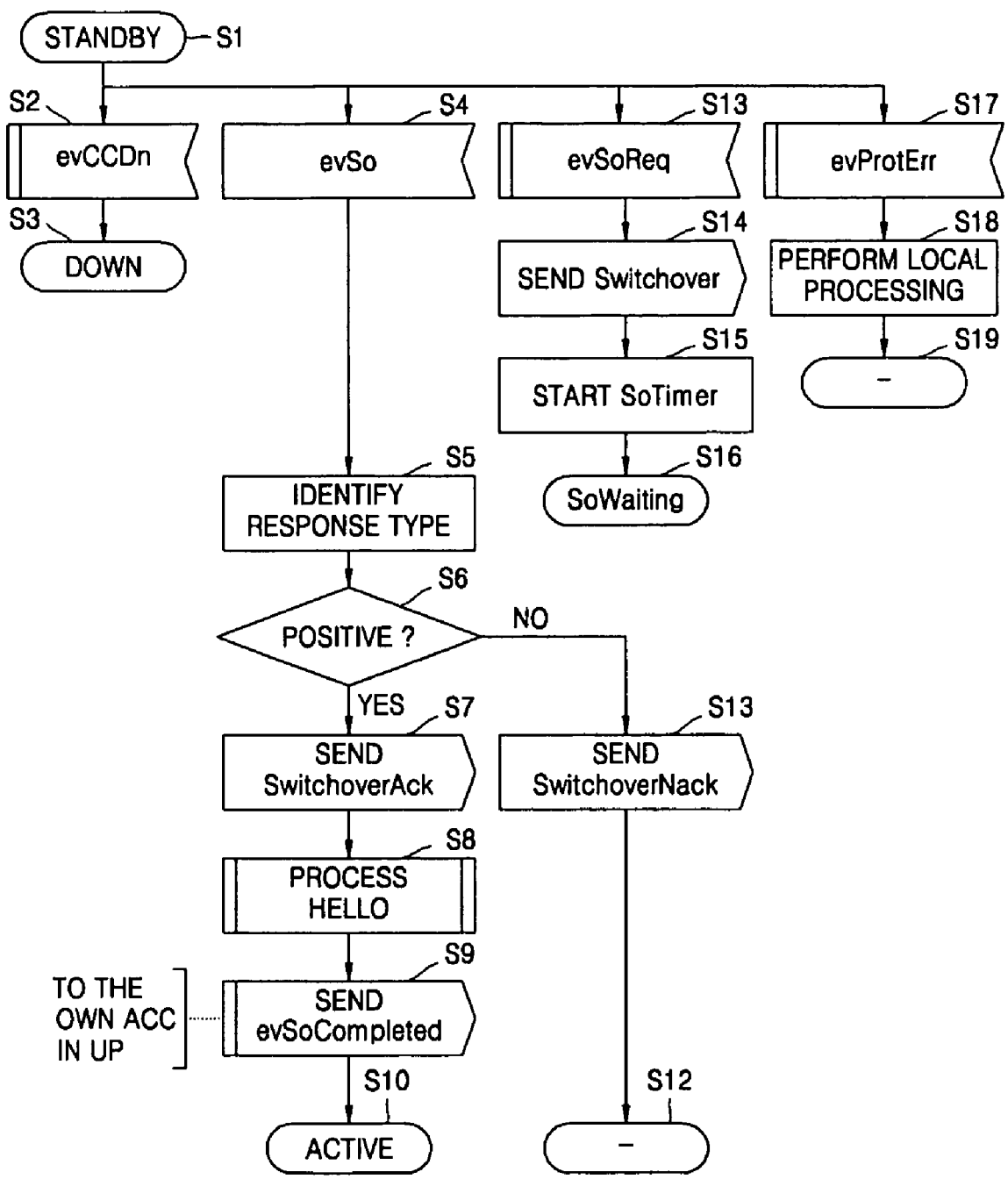
Figure 17A:
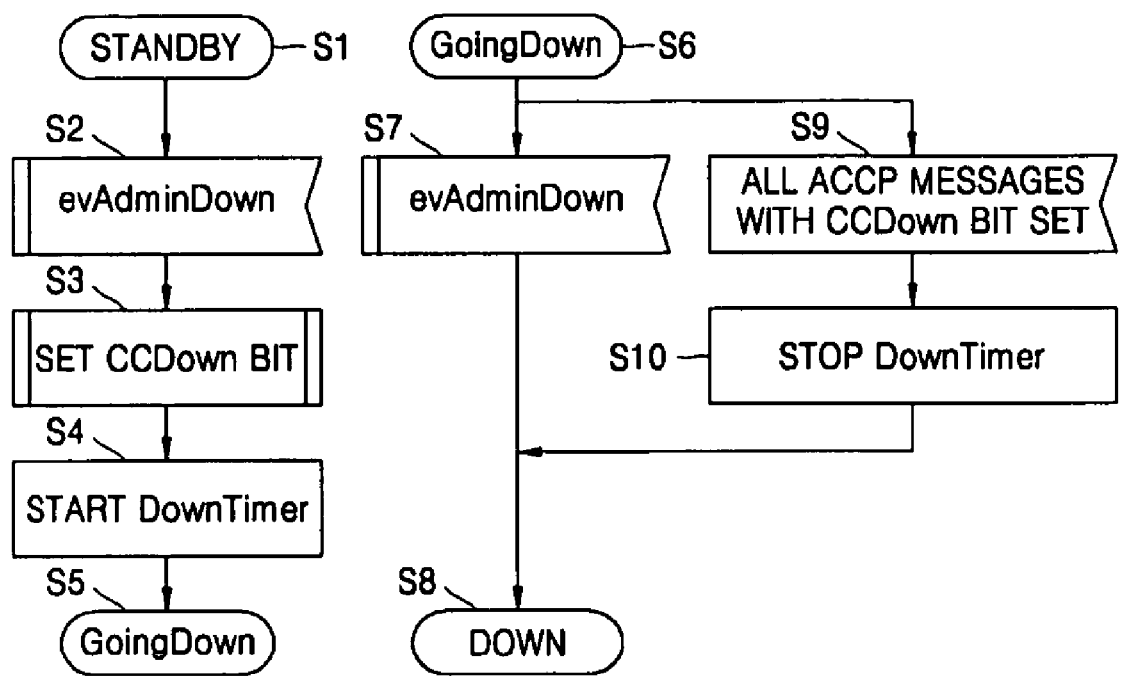
Figure 17B:
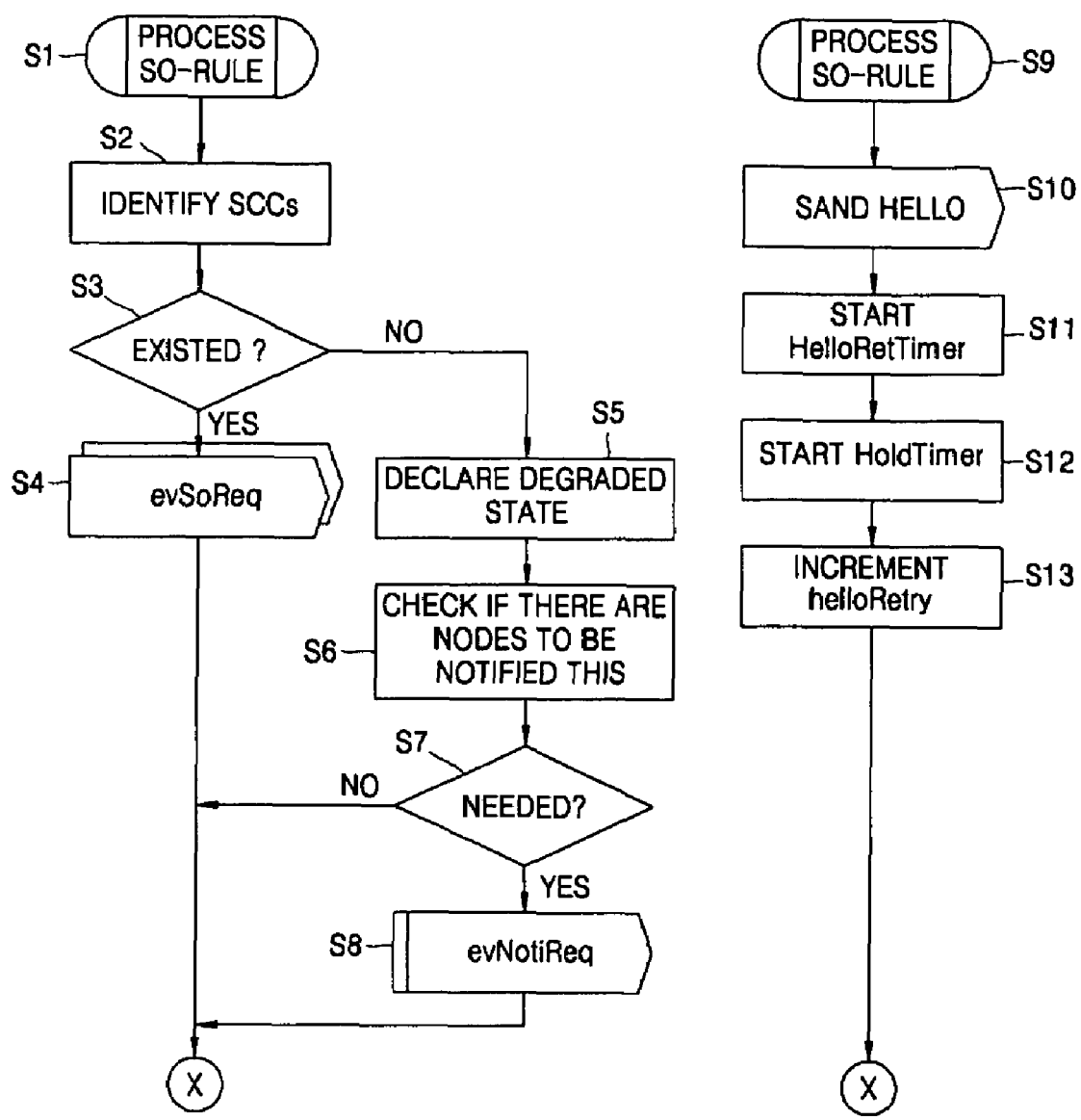

FIG. 12A illustrates a flowchart of a transition from an Down state to a Ready state and a process after receiving events evConfDone and evConfErr;

FIG. 12B illustrates a flowchart of a process after receiving events evCCDn, evNWTimer, evConf, evProtErr, and evConfRetTimer in the Ready state;

FIG. 12C illustrates a flowchart of a process that the receiving node responds to the sending one from the step to identify its response type after receiving event evConf in the Ready state;

FIG. 13A illustrates a flowchart of a process after receiving events evCCDn, evHoldTimer, evHelloRcvd, evProtErr, and evSeqNumErr in the Active state;

FIG. 13B illustrates a flowchart of a process after receiving an event evHelloRetTimer in the Active state;

FIG. 14A illustrates a flowchart of a process after receiving events evInqryDone, evInqryErr, evInqryReq, evInqry, and evNotiReq in the Up state;

FIGS. 14B through 14E illustrate flowcharts of a process after receiving events evCCDn, evProtErr, evSeqNumErr, evHelloRcvd, and evHelloRetTimer, evNoti, evDCConf, evDCConfDone, evDCConfErr, evDCConfTimer, evDCConf2Timer, and evSoCompleted in the Up state;

FIG. 15 illustrates a flowchart of a process after receiving events evSoDone, evSo, evCCDn, and evProtErr in the SoWaiting state;

FIG. 16 illustrates a flowchart of a process after receiving events evCCDn, evSo, evSoReq, and evProtErr in the Standby state;

FIG. 17A illustrates a flowchart of a process after receiving an event evAdminDown in all states except the Down state; and illustrates a flowchart of a process after receiving an event evDownTimer or after receiving all ACCP messages with the CCDown bit set in the GoingDown state; and FIG. 17B illustrate flowcharts of macro procedures of switchover rule and hello operations that could be used in other all flowcharts except for these flowcharts;

DETAILED DESCRIPTION OF THE INVENTION

The present invention will now be described more fully with reference to the accompanying drawings, in which exemplary embodiments of the invention are shown.

Figure 1:
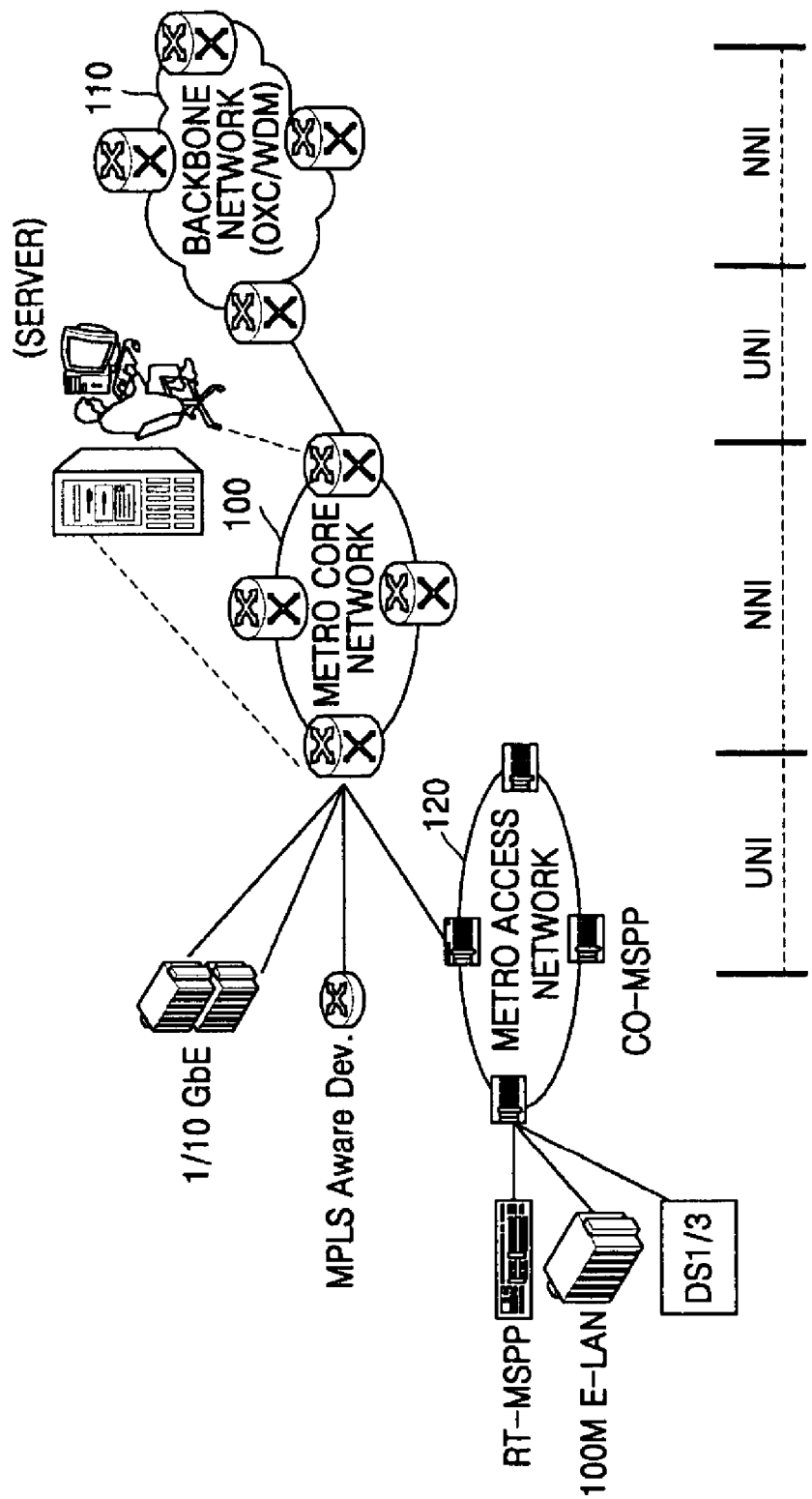
FIG. 1 is a conceptual diagram of an IP-based network.

FIG. 1 is a conceptual diagram of an IP-based network. Referring to FIG. 1, the IP-based network includes a metro core network 100, a backbone network 110, and a metro access network 120 which are correlated there between. The metro core network 100 includes a half capacity router. The metro access network 120 that is a client network for exchanging tributary signals includes a non-Multi Protocol Label Switching (MPLS) (or MPLS) router, an Ethernet switch, and a Remote Terminal or Central Office Terminal—Multi-service Provisioning Platform (RT/COT-MSPP). The backbone network 110 for exchanging main signals is configured as an optical link distribution system such as Optical Cross Connect (OXC). A control plane in an optical Internet can be classified as a User to Network Interface (UNI) and a Network to Network Interface (NNI) in view of an interface between network nodes. The UNI is used to automatically control connections using the control plane between an Automatic Switched Transport Network (ASTN) and a client. An interface between network providers in the ASTN is referred to as External (E)-NNI and an interface between control plane entities in a single network provider is referred to as Internal (I)-NNI.

Figure 2A:
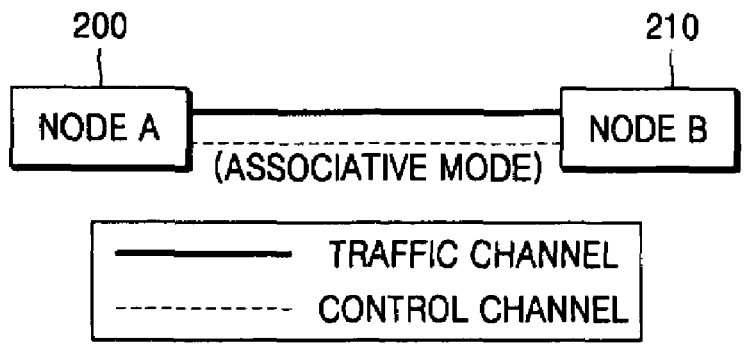
FIGS. 2A, 2B, and 2C illustrates a signal relation in a control network to which the present invention is applied.
Figure 2B:
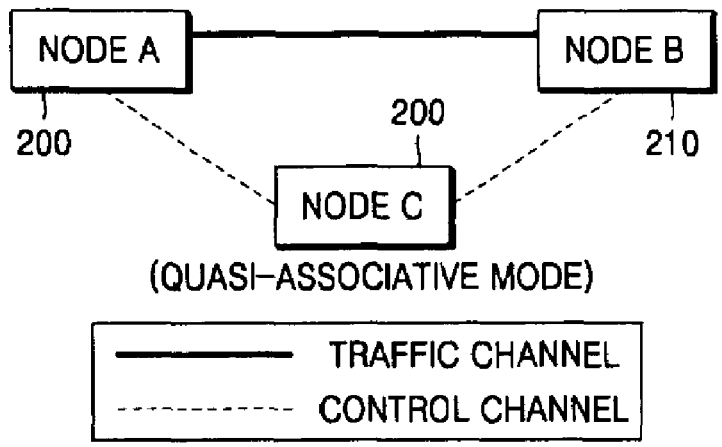
Figure 2C:
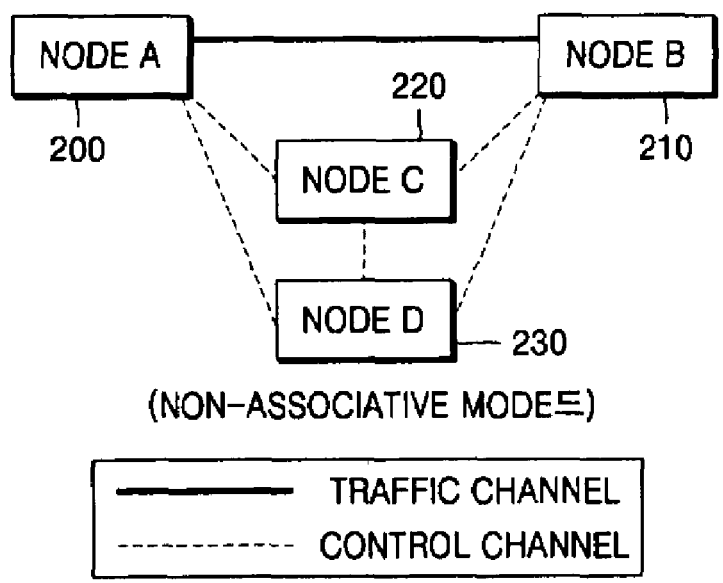

FIG. 2 illustrates a signal relation in a control network to which the present invention is applied. Referring to FIG. 2A, in an associative mode, a control channel is connected between a node A 200 and a node B 210 like a traffic control channel. Referring to FIG. 2B, in a quasi-associative mode, although the traffic control channel is connected between the node A 200 and the node B 210, the control channel is configured a fixed channel previously determined using another node between the node A 200 and the node B 210. Referring to FIG. 2C, in a non-associative mode similar to the quasi-associative mode, the configuration of the control channel differs according to time or a network condition.

In order to solve technical requirements for protecting/switching the control channel in the present invention, the associative mode, the quasi-associative mode, and the non-associative mode are established as the PG-1 in which control channels are directly connected between adjacent nodes, the PG-2 in which control channels are indirectly connected between adjacent nodes according to a predefined route, and the PG-3 in which control channels are connected via an internal or external IP network, respectively.

Figure 3:
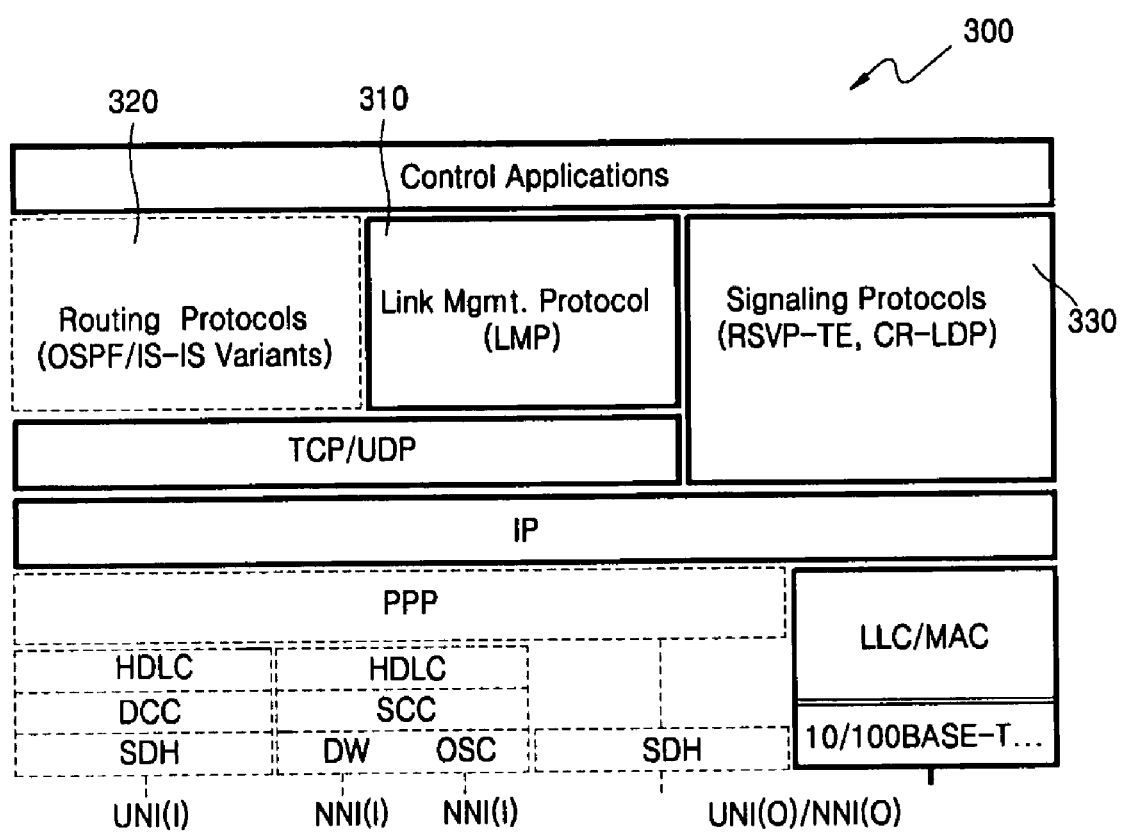
FIG. 3 illustrates a control protocol stack of an optical Internet according to an embodiment of the present invention.

FIG. 3 illustrates a control protocol stack of an optical Internet according to an embodiment of the present invention. Referring to FIG. 3, the structure of the protocol stack 300 of an optical Internet control plane for signaling and routing functions is the extended structure of a Multi Protocol Label Switching Layer (MPLS) protocol stack and additionally includes a Link Manager Protocol (LMP) 310.

To be more specific, the protocol stack 300 extends functions of UNI, NNI, and Generalized Multi-Protocol Label Switching (GMPLS) according to application sections with regard to the LMP 310 used to perform a Neighborhood Detection (ND) and a Service Detection (SD) or determine an error location, etc., a routing protocol 320 such as an Open Shortest Path First (OSPF) and an Interior System to Interior System (IS-IS), a signaling protocol 330 such as a Constraint based Routing-Label Distribution Protocol (CR-LDP) used to control a call/connection or a Resource Reservation Protocol-Traffic Engineering (RSVP-TE).

IP control packets generated in such upper protocols are exchanged through lower protocols such as a Point to Point Protocol (PPP). The protocol stack 300 uses a High-Level Data Link Control (HDLC) unit when a specific time slot of a transmission plane is used.

The present invention can be replaced with a control channel management function in the LMP 310 and can be used in a network environment that does not uses the LMP 310 but only requires functions of constituting and protecting/changing over the control channel.

Figure 4:
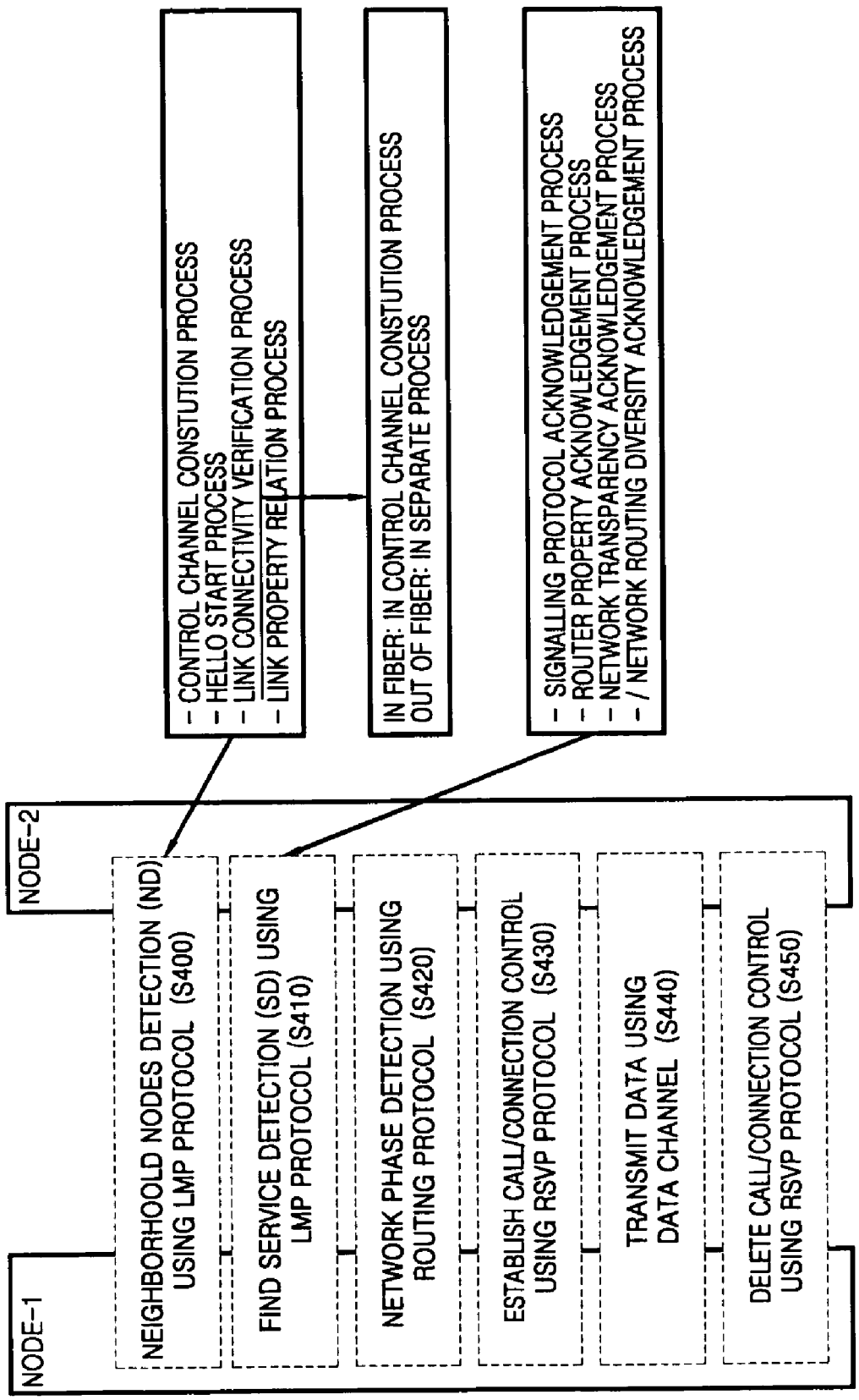
FIG. 4 is a flowchart of general processing using a Link Manager Protocol (LMP), a routing protocol, and a signaling protocol in an optical Internet network.

FIG. 4 is a flowchart of general processing using the LMP, the routing protocol (e.g., OSPF), and the signaling protocol (e.g., RSVP-TE) in an optical Internet system. Referring to FIG. 4, the UNI specification suggests an LMP-based ND/SD process and a CR-LDP or RSVP-TE-based call/connection control process. A basic constitution and a link connection of the IP control channel are completely verified according to an ND process (Operation S400). A version of the signaling protocol, and transmission characteristics of a client and a backbone network are exchanged according to an SD process (Operation S410).

A link status and network phase information are exchanged using the routing protocol and an end-to-end route in a network is determined (Operation S420). A call/connection establishment process is performed (Operation S430) and user information is transmitted via the transmission plane (Operation S440). A call/connection deletion process is performed if necessary (Operation S450).

The ND process consists of constituting a control channel, starting a Hello start, verifying the link connection, and associating link properties. The SD process consists of determining the signaling protocol, router properties, a network transparency, and a network routing diversity.

The NNI specification is classified as an Internal (I)-NNI and an External (E)-NNI. Even though an object of the NNI specification is restricted to the E-NNI, the I-NNI is generally configured as a subset of the-NNI for network simplification reasons.

Figure 5:
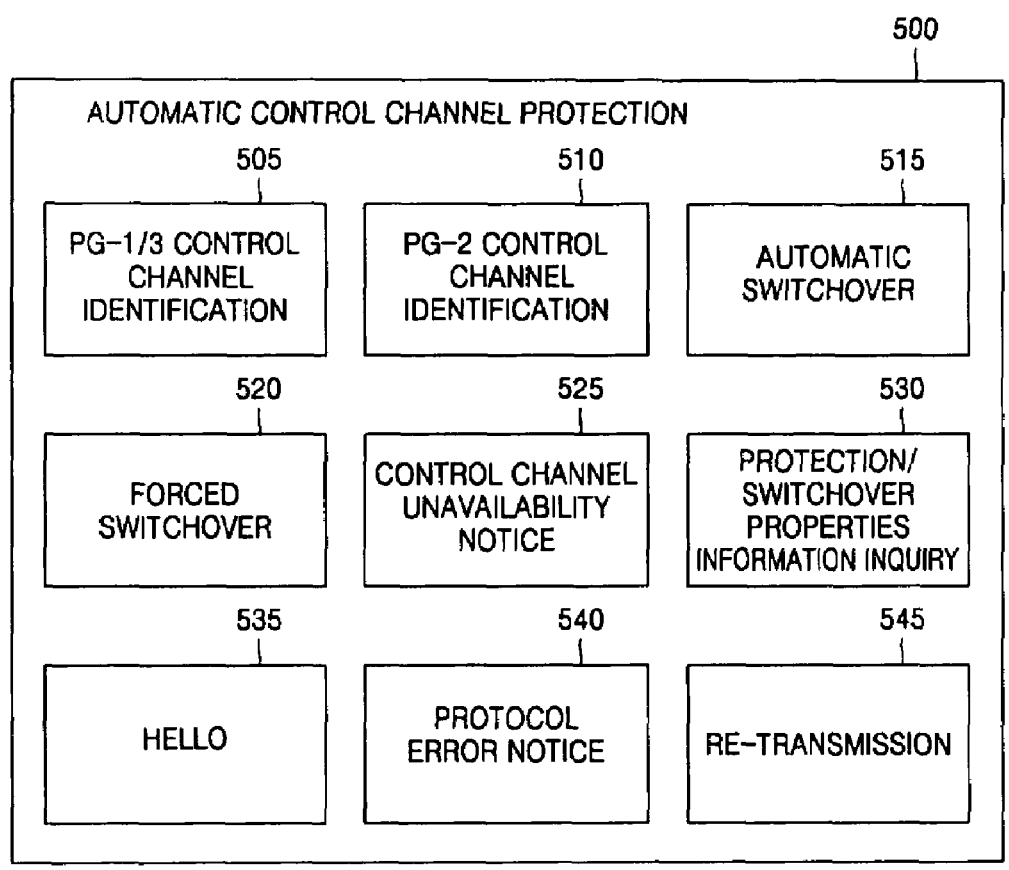
FIG. 5 is a block diagram of functions of constituting/protecting an automatic control channel according to an embodiment of the present invention.

FIG. 5 is a block diagram of functions of constituting/protecting an automatic control channel according to an embodiment of the present invention. Referring to FIG. 5, the present invention includes functions of PG-1/3 control channel identification 505, detour control channel identification 510, an automatic switchover 515, a forced switchover 520, a control channel unavailability notice 525, a protection/switchover properties information inquiry 530, an Hello 535, a protocol error notice 540, and a re-transmission 545.

The PG-1/3 Control Channel Identification 505

This function allows two adjacent nodes to configure the communication environment of PG-1 and PG-3 control channels. Its procedure to identify active and standby control channels differs from the way how to connect physical links between nodes. That is, in case of point-to-point connection, control channels are identified using a multicast address, and in other cases, they are identified using a unicast address.

The originating node sends Config messages and waits responses from its peer over control channels without relation to the type of control link (point-to-point or multiple-access). At this point, the node should indicate its protocol capability about the DCC configuration.

After receiving the Config message, the terminating node determines the Active Control Channel (ACC), Standby Control Channel (SCC) and protocol capability used between adjacent nodes, and replies to the configuration request with a ConfigAck message including these objects in case of a successful response to be sent. Then, there may be a possibility that the terminating node can receive one or more Config messages from the same originating node. Accordingly, the node returns a ConfigAck message in case that control channels can be used as ACC and SCC, or returns a ConfigNack message including a proper cause, which are based on the protocol capability received from the peer node as needed.

With the request and response of control channel configuration, the originating and terminating nodes can grasp the peer node identifier, its type, and so on of each control channel.

Detour Control Channel Identification 510

This function is used to configure a more powerful control network after the identification of PG-1 and PG-3 control channels. This is to establish a detour route using PG-1 or PG-3 control channels over one or more transit nodes between adjacent nodes. Note that the detour route is established using ACCs of the PG-1 or PG-3 configured previously between other adjacent nodes.

For the dynamic designation of DCCs between adjacent nodes, the originating node sends to its relay node a DCConfig message that includes local and remote node identifiers. In order to support this function, the originating node should complete the identification of PG-1 and PG-3 control channels within the own node, and use other ACCs except for the ACC that is directly connected to the terminating node. Consequently, the originating node multicasts the DCConfig message as many as the number of the other ACCs.

After receiving the DCConfig message, the transit node makes sure that the own is not a terminating node for the message, relays the message towards the terminating node. At this point, the node appends the own node identifier to the relay node list. Then, sending a DCConfig message to a succeeding node or sending a response message to the previous node, the node applies the message sending rule as follows:

If the hop-counter value estimated from the relay node list exceeds the maximum threshold that can be different every network topology (in case of the full mesh, tentatively 3), the transit node returns a DCConfigNack message;

If the node to which the transit node wants to forward the message is not the terminating one but the originating one, the transit node returns a DCConfigNack message towards the direction from which the message was received;

After sending a DCConfig message towards a terminating node, if the transit node receives a DCConfig, then the node responds with a DCConfigNack message;

After returning a response message towards the original node, if the transit node receives a DCConfig message, the node returns a DCConfigNack message towards the direction from which the message was received;

If there is an ACC directly connected to the terminating node, the transit node sends a DCConfig message over the control channel;

When not being capable of sending a DCConfig message to the terminating node, the transit node multicasts the DCConfig message over one or more other ACCs.

Lastly, when the terminating node receives the first DCConfig message, if the node responds to the request with a DCConfigAck message, then the node should respond to the subsequent requests with DCConfigNack messages.

A transit node that received the DCConfigAck message appends the own node identifier to the relay node list, and updates a routing table in order to forward control packets over the Detour Control Channel (DCC). Then, the node relays the message towards the originating node.

While configuring PG-1 and PG-3 control channels and DCCs, only the ACC can carry control packets of signaling and routing protocols.

Automatic Switchover 515

When a failure on the ACC in use occurs, this function is used to switchover to a control channel that first responds to the switchover request (called multicast switchover).

Switchover messages are multicast via all standby control channels except for the current ACC between adjacent nodes. Especially, when switchover group messages are exchanged over a detour route, they have to be forwarded at the IP layer of a transit node, and have not to be gone up the application layer.

The originating node that requests the automatic switchover sends to its terminating node a Switchover message with an indication of switchover type, "automatic switchover". Then, the terminating node should reply to the request with a SwitchoverAck message for a successful response or SwitchoverNack message for an unsuccessful response. When switchover group messages are exchanged over a detour route, they have to be forwarded at the IP layer of a transit node, and have not to be gone up the application layer.

Forced Switchover 520

Differently from the automatic switchover, this function is used to switchover a control channel compulsorily for the purpose of operation and administration via an intervention of operator.

The originating node that requests a forced switchover sends to its terminating node a Switchover message with an indication of switchover type, "forced switchover". Then, the terminating node should reply to the request with a SwitchoverAck message for a successful response or SwitchoverNack message for an unsuccessful response. Like the automatic switchover, when switchover group messages are exchanged over a detour route, they have to be forwarded at the IP layer of a transit node, and have not to be gone up the application layer.

Control Channel Unavailability Notice 525

This function is used to notify that there is no ACC to forward control packets towards the terminating node due to subsequent failures of other ACCs. This is called, DCC full down. A Notify message is used for the notification. If the node that is notified the unavailability of control channels is not the original node, this process of relaying the Notify message is repeated until the original node receives the message.

Protection/Switchover Properties Information Inquiry 530

This function is used to retrieve the protection and switchover attributes of control channels over an ACC between adjacent nodes, which are kept in its peer.

The protection and switchover attributes of control channels can be classified into the ACC attributes and SCC ones. Accordingly, the original node and its terminating node can identify if the own node has the same attributes with its peer except for DCC related contents.

The node that requests protection and switchover attributes of control channels send a SAInqry message to its peer. The node that receives the message responds to the request with a SAInqryAck message for a successful response or SAInqryNack message for an unsuccessful response.

Hello 535

This function is the same one to that in the LMP specification. However, Nodes over a PG-3 route might not detect the condition of an unavailable control channel because they do not have the function of control channel management. On a failure of control channel over the detour route, there may be a situation that the availability of a control channel can not be guaranteed within a proper timing limit. Also, different addressing scheme of control channels among PGs can be applied, and the same addressing scheme of control channels within a PG should be applied.

Protocol Error Notice 540

A functional entity for the resilience of control networks should check protocol error conditions as a general rule before acting upon a message after receiving the message from the peer entity. If there is no protocol error within the received message, resultant operations would be performed. However, if a protocol error occurs, the receiving entity should notify the sending entity of the situation using ProtError message, and there is no action against the received message.

Re-Transmission 545

The re-transmission function 545 is identical to the "re-transmission" of the LMP.

FIG. 6 illustrates a protection/switchover table applied for constituting/protecting the automatic control channel according to an embodiment of the present invention. Referring to FIG. 6, prior rules are necessary for constituting/protecting the automatic control channel as follows:

To support the protection/switchover of the control channel, more than two control channels between two neighborhood nodes are necessary via a direct or indirect connection.

The automatic protection/switchover requests the protection/switchover in a node that senses an error. If both of the nodes sense the error, they compete for the protection/switchover request, and a node having a higher node identifier wins the competition.

A system must establish a transmission medium (e.g., SDH-RA, SDH-MS, EoS, Ethernet, etc.) and the protection group (PG-1 or PG-3) for each control channel in each node.

When a protocol for constituting/protecting the automatic control channel between two neighborhood nodes is used based on the prior rules, the detailed protection/switchover property information of the control channel maintained in the system is as follows:

Local control channel identifier (Local CC) 605: statically designated

Remote control channel identifier (Remote CC) 610: dynamically designated

Detour control channel (Detour CC) 615: dynamically designated

Transmission media 620: statically designated

Control channel type (CC Type) 625: dynamically designated

Figure 7:
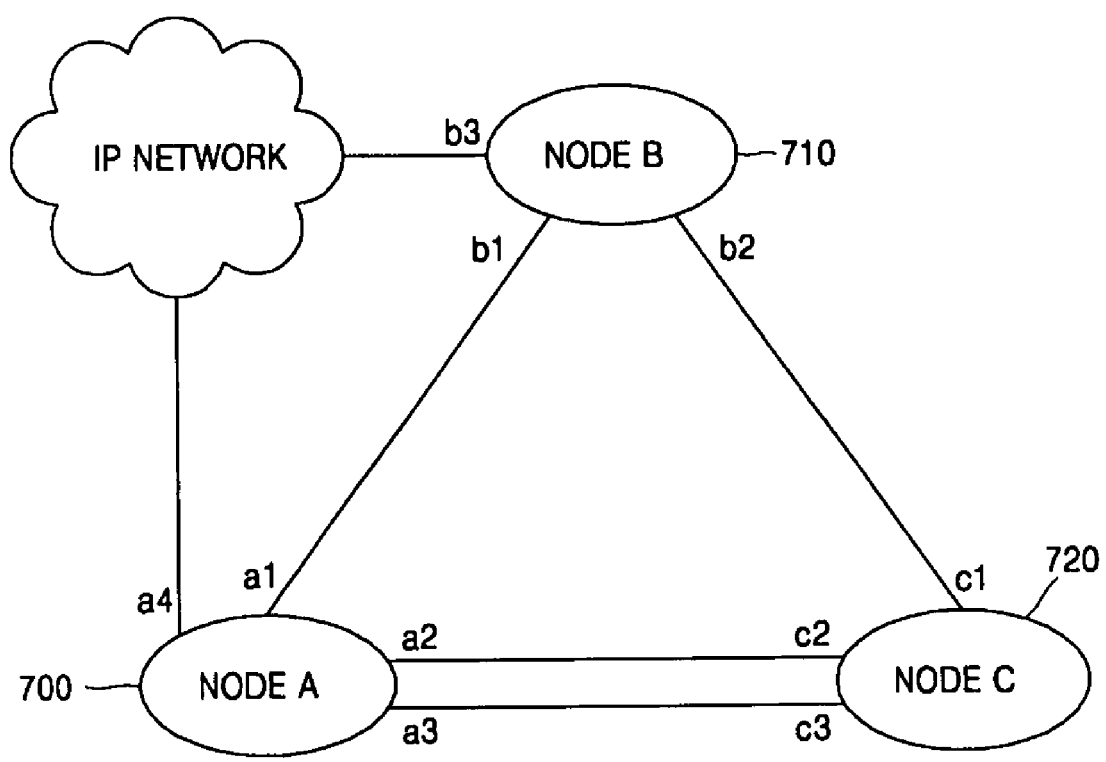
FIG. 7 illustrates a sample network necessary for a conversion process of the protection/switchover table applied for constituting/protecting the automatic control channel according to an embodiment of the present invention.

Protection group (PG) type 630: every control channel is statically designated to the PG-1 or the PG-3 in an initial stage Neighborhood node (A-Node) 635: dynamically designated Control channel status (CC Status) 640: dynamically designated FIG. 7 illustrates a sample network necessary for a conversion process of the protection/switchover table applied for constituting/protecting the automatic control channel according to an embodiment of the present invention. Referring to FIG. 7, assume that a node A 700 maintains four control channels a1, a2, a3, and a4, a node B 710 maintains three control channels b1, b2 and b3, and a node C 720 maintains three control channels c1, c2, and c3.

Table contents maintained by each node in an initial provision are as follows:

TABLE 1

(node A)

| Local CC | Remote CC | Detour CC | Media | CC type | PG | A-Node | CC status |
|---|---|---|---|---|---|---|---|
| a1 | | | GbE | | 1 | | |
| a2 | | | GbE | | 1 | | |
| a3 | | | GbE | | 1 | | |
| a4 | | | fE | | 3 | | |

TABLE 2

(node B)

| Local CC | Remote CC | Detour CC | Media | CC type | PG | A-Node | CC status |
|---|---|---|---|---|---|---|---|
| b1 | | | GbE | | 1 | | |
| b2 | | | GbE | | 1 | | |
| B3 | | | fE | | 3 | | |

TABLE 3

(node C)

| Local CC | Remote CC | Detour CC | Media | CC type | PG | A-Node | CC status |
|---|---|---|---|---|---|---|---|
| c1 | | | GbE | | 1 | | |
| c2 | | | GbE | | 1 | | |
| c3 | | | GbE | | 1 | | |

If a control channel between neighborhood nodes is determined, each node maintains the following table:

TABLE 4

(node A)

| Local CC | Remote CC | Detour CC | Media | CC type | PG | A-Node | CC status |
|---|---|---|---|---|---|---|---|
| a1 | b1 | | GbE | Standby | 1 | B | Up |
| a2 | c2 | | GbE | Active | 1 | C | Up |
| a3 | c3 | | GbE | Standby | 1 | C | Up |
| a4 | b3 | | fE | Active | 3 | B | Up |

TABLE 5

(node B)

| Local CC | Remote CC | Detour CC | Media | CC type | PG | A-Node | CC status |
|---|---|---|---|---|---|---|---|
| b1 | a1 | | GbE | Standby | 1 | A | Up |
| b2 | c1 | | GbE | Active | 1 | C | Up |
| b3 | a4 | | fE | Active | 3 | A | Up |

TABLE 6

(node C)

| Local CC | Remote CC | Detour CC | Media | CC type | PG | A-Node | CC status |
|---|---|---|---|---|---|---|---|
| c1 | b2 | | GbE | Active | 1 | B | Up |
| c2 | a2 | | GbE | Active | 1 | A | Up |
| c3 | a3 | | GbE | Standby | 1 | A | Up |

After a dynamic designation operation for a detour control channel is performed, each node maintains the following control channel table:

TABLE 7

(node A)

| Local CC | Remote CC | Detour CC | Media | CC type | PG | A-Node | CC status |
|---|---|---|---|---|---|---|---|
| a1 | b1 | a2 | GbE | Standby | 1 | B | Up |
| a2 | c2 | a4 | GbE | Active | 1 | C | Up |
| a3 | c3 | a4 | GbE | Standby | 1 | C | Up |
| a4 | b3 | a2 | fE | Active | 3 | B | Up |

TABLE 8

(node B)

| Local CC | Remote CC | Detour CC | Media | CC type | PG | A-Node | CC status |
|---|---|---|---|---|---|---|---|
| b1 | a1 | b2 | GbE | Standby | 1 | A | Up |
| b2 | c1 | b3 | GbE | Active | 1 | C | Up |
| b3 | a4 | b2 | fE | Active | 3 | A | Up |

TABLE 9

(node C)

| Local CC | Remote CC | Detour CC | Media | CC type | PG | A-Node | CC status |
|---|---|---|---|---|---|---|---|
| c1 | b2 | c2 | GbE | Active | 1 | B | Up |
| c2 | a2 | c1 | GbE | Active | 1 | A | Up |
| c3 | a3 | c1 | GbE | Standby | 1 | A | Up |

FIG. 8 illustrates status definition of the protocol for constituting/protecting the automatic control channel according to an embodiment of the present invention. Referring to FIG. 8, the present invention uses six statuses of an Down 810, Ready 820, Active 830, Standby 840, SOWaiting 850, Up 860, and GoingDown 870.

The Down status 810 is the same to the LMP specification, which means the initial control channel state. The Ready status 820 is a status for exchanging Hello intervals and protection attributes, and for identifying active and standby control channels. The Active status 830 is the same to the LMP specification, which periodically sends a Hello. Additionally in this status an active control channel is designated. The Standby 840 status is a status that a control channel is waiting for converting into an active control channel. The SOWaiting 850 status is a status that a control channel is waiting for a response to switchover request for being an active control channel. The Up status 860 is the same to the LMP specification. Additionally in this status control packets can be exchanged, and a switchover can occur. The GoingDown status 870 is the same to the LMP specification, which is used to go into Down status about a relevant control channel because of administrative action.

FIGS. 9A and 9B illustrates the definition 900 of events used for the protocol for constituting/protecting the automatic control channel according to an embodiment of the present invention. FIGS. 9A and 9B suggests events necessary for performing functions suggested in FIG. 5 and events causing a status change although all the events necessary for the present invention are not suggested. Messages used in the definition 900 are illustrated in FIG. 11A.

Referring to FIGS. 9A and 9B, the definition 900 includes an event evBringUp indicating that the constitution of a control channel starts, an event evCCDn indicating that the control channel is no longer available, an event evConf indicating that a Config message is received from a relative node, an event evConfDone indicating that a ConfigAck message is received from the relative node, and an event evConfErr indicating that a ConfigNack message is received from the relative node.

The definition 900 also includes an event evDCConf indicating that a DCConfig message is received from the relative node, an event evDCConfDone indicating that a DCConfigAck message is received from the relative node, and an event evDCConfErr indicating that a DCConfigNack message is received from the relative node.

The definition 900 also includes an event evHoldTimer indicating that a Hello large interval timer expires, an event evHelloRcvd indicating that a "Hello" message including a valid order number is received from the relative node, an event evHelloRetTimer indicating that a Hello small interval timer expires, an event evNoti indicating that a "Notify" message is received from the relative node, an event evNotiReq indicating that the "Notify" message has to be transmitted to the relative node, an event evNWTimer indicating that a negotiation standby timer expires, an event evProtErr indicating that a "ProtError" message is received from the relative node.

The definition 900 includes an event evInqry indicating that a "SAInqry" message is received from the relative node, an event evInqryDone indicating that a "SAInqryAck" message is received from the relative node, and an event evInqryErr indicating that a "SAInqryNack" message is received from the relative node.

The definition 900 includes an event evSoReq indicating that the active control channel is down or the switchover of the control channel is performed by an operator, an event evSo indicating that a "Switchover" message is received from the relative node, an event evSoDone indicating that a "SwitchoverAck" message is received from the relative node, an event evSoErr indicating that a "SwitchoverNack" message is received from the relative node, and an event evSoTimer indicating that a switchover timer expires.

Figure 10:
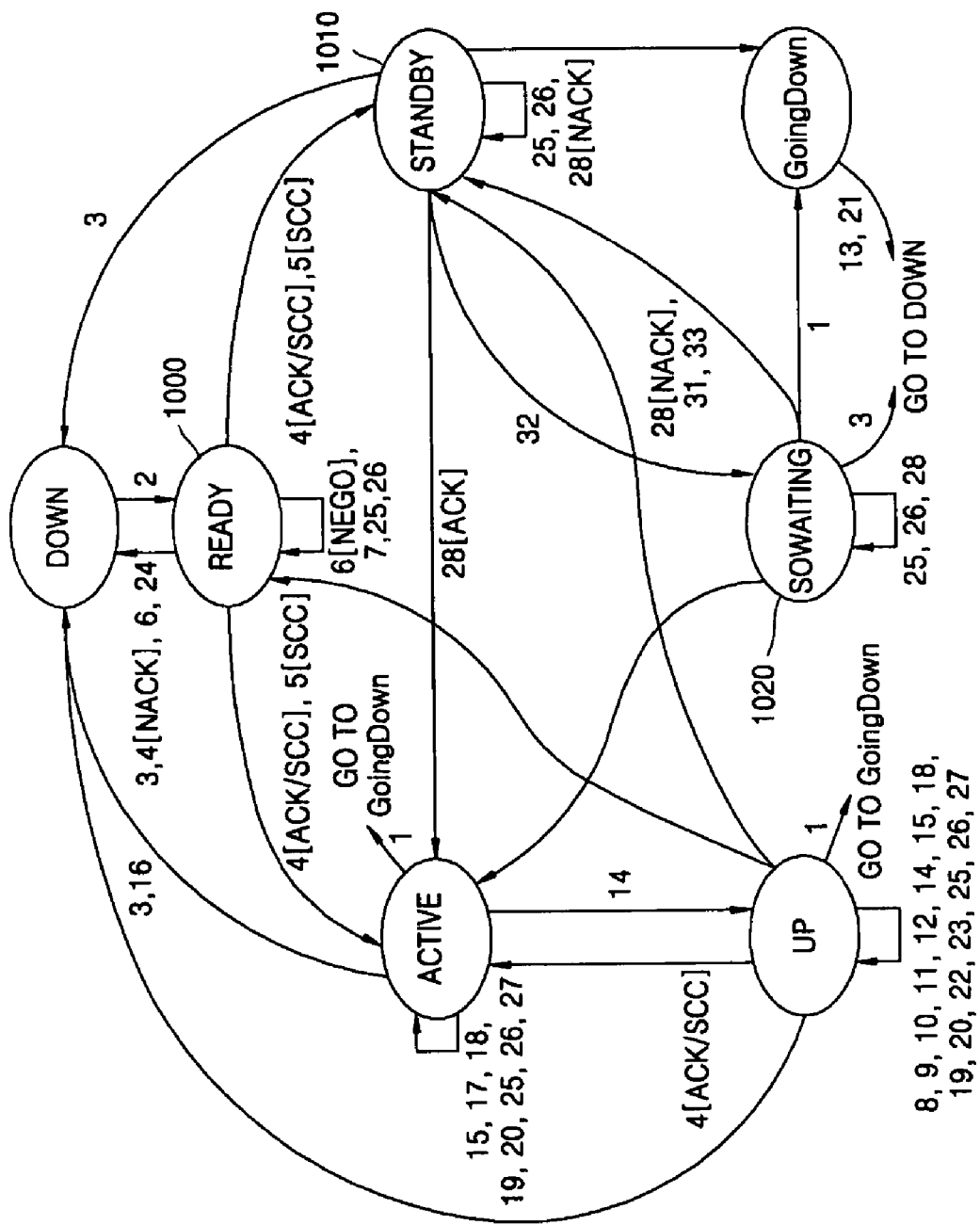
FIG. 10 illustrates the status transition of the protocol for constituting/protecting the automatic control channel according to an embodiment of the present invention based on the status definition in FIG. 8 and the event definition in FIG. 9.

FIG. 10 illustrates the status transition of the protocol for constituting/protecting the automatic control channel according to an embodiment of the present invention based on the status definition in FIG. 8 and the event definition in FIG. 9. Referring to FIG. 10, there are a variety of transition processes in receiving the event evConf in the Ready status 1000 due to the ConfigAck message or the ConfigNack message (refer to FIG. 11A). There are also a variety of transition processes in receiving the evSo event in the Standby status 1010 and the SOWaiting status 1020 due to the SwitchoverAck message or the SwitchoverNack message (refer to FIG. 11A).

FIGS. 11A and 11B illustrates the definition of messages and objects used to support the protocol for constituting/protecting the automatic control channel between two neighborhood nodes according to an embodiment of the present invention. Referring to FIG. 11A, the LMP protocol uses the Hello message as it is and extends related parameters of the Config, ConfigAck, and ConfigNack messages for the protection/switchover of the control channel. Other messages are newly added for the protection/switchover of the control channel. The following is the definition of messages and objects in bold letters, newly added for the protection/switchover of the control channel in comparison with a control channel management of the LMP protocol.

Config

In addition to the Config message defined in the LMP specification, CC_PROPERTY and ADDI_INFO_INDICATOR objects are included to tell the property and the capability of the control channel or the own node. Its format is as follows:

```
<Config Message> ::=
    <Common Header> <LOCAL_CCID> <MESSAGE_ID>
    <LOCAL_NODE_ID> <CONFIG> <CC_PROPERTY>
    <ADDI_INFO_INDICATOR>
```

ConfigAck

In addition to the ConfigAck message defined in the LMP specification, CC_PROPERTY and ADDI_INFO_INDICATOR objects are included. Its format is as follows:

```
<ConfigAck Message> ::=
    <Common Header> <LOCAL_CCID> <LOCAL_NODE_ID>
    <REMOTE_CCID> <MESSAGE_ID_ACK>
    <REMOTE_NODE_ID>
    <CC_PROPERTY>
```

ConfigNack

In addition to the ConfigNack message defined in the LMP specification, CC_PROPERTY, ADDI_INFO_INDICATOR, and REJECT_CAUSE objects are included. Its format is as follows:

```
<ConfigNack Message> ::=
    <Common Header> <LOCAL_CCID> <LOCAL_NODE_ID>
    <REMOTE_CCID> <MESSAGE_ID_ACK>
    <REMOTE_NODE_ID>
    <CONFIG> <REJECT_CAUSE>
```

DCConfig

This message is used to request the configuration of a DCC. LAST_LOCAL_NODE_ID, LAST_REMOTE_NODE_ID, CC_PROPERTY, and RELAY_NODE_ID objects are included. While traversing nodes towards the last remote node, a relay node adds the own node identifier to the RELAY_NODE_ID list. Its format is as follows:

```
<DCConfig Message> ::=
    <Common Header> <MESSAGE_ID>
    <LAST_LOCAL_NODE_ID> <LAST_REMOTE_NODE_ID>
    [<RELAY_NODE_ID >...]
```

DCConfigAck

This message is used to notify an agreement about the request to configure a DCC. RELAY_NODE_ID objects are the same to the ones in the previously received DCConfig message. Its format is as follows:

```
<DCConfigAck Message> ::=
    <Common Header> <MESSAGE_ID_ACK>
    <LAST_LOCAL_NODE_ID> <LAST_REMOTE_NODE_ID>
    [<RELAY_NODE_ID >...]
```

DCConfigNack

This message is used to notify a rejection about the request to configure a DCC. Its format is as follows:

```
<DCConfigNack Message> ::=
    <Common Header> <MESSAGE_ID_ACK> <REJECT_CAUSE>
```

Hello

The Hello message is the same as the message used in the LMP protocol.

Switchover

This message is used to request the automatic or forced switchover to a particular control channels. Its format is as follows:

```
<Switchover Message> ::=
    <Common Header> <MESSAGE_ID> <LOCAL_CCID>
    <LOCAL_NODE_ID> <SEQUENCE_NUMBER>
    <SWITCHOVER_TYPE>
```

SwitchoverAck

This message is used to notify an agreement about the request of automatic or forced switchover to a particular control channel. Its format is as follows:

```
<SwitchoverAck Message> ::=
    <Common Header>
    <LOCAL_CCID> <LOCAL_NODE_ID> < REMOTE_CCID>
    <MESSAGE_ID_ACK>
    <REMOTE_NODE_ID> <SEQUENCE_NUMBER>
```

SwitchoverNack

This message is used to notify a rejection about the request of automatic or forced switchover to one or more control channels. Its format is as follows:

```
<SwitchoverNack Message> ::=
    <Common Header>
```

Notify

This message is used to notify that there is no DCC any more for the switchover. Its format is as follows:

```
<Notify Message> ::=
    <Common Header> <LOCAL_CCID> < REMOTE_CCID>
```

SAInqry

This message is used to request the protection and switchover attributes for one or more control channels, which have been kept in its peer. Its format is as follows:

```
<SAInqry Message> ::=
    <Common Header> <MESSAGE_ID>
```

SAInqryAck

This message is used to notify an agreement about the request of protection and switchover attributes for one or more control channels. Its format is as follows:

```
<SAInqryAck Message> ::=
    <Common Header> <MESSAGE_ID_ACK>
    <ACC_SWITCHOVER_ATTR>
    [<SCC_SWITCHOVER_ATTR>]
```

SAInqryNack

This message is used to notify a rejection about the request of protection and switchover attributes for one or more control channels. Its format is as follows:

```
<SAInqryNack Message> ::=
    <Common Header> <MESSAGE_ID_ACK> <REJECT_CAUSE>
```

ProtError

This message is used to notify a protocol error that is detected in a received message. Its format is as follows:

```
<ProtError Message> ::=
    <Common Header> <PROT_ERROR>
```

Referring to FIG. 11B, the format rules for objects used in the present invention to support the protection/switchover of a control channel are as follows:

CCID

This object is identical to the object defined in the LMP protocol.

Message ID

This object is identical to the object defined in the LMP protocol.

NODE ID

This object defined in the LMP specification adds LAST_LOCAL_NODE_ID, LAST_REMOTE_NODE_ID, and RELAY_NODE_ID types.

C-Type = 3, LAST_LOCAL_NODE_ID

C-Type = 4, LAST_REMOTE_NODE_ID

C-Type = 5, RELAY_NODE_ID

| Node_ID |
|---|

Node_ID: 32 bits
which indicates a last local node, last remote node, or relay node.

CONFIG

This object is identical to the object defined in the LMP protocol.

Hello

This object is identical to the object defined in the LMP protocol.

CC Property

This object indicates the general information of a control channel, including its type, the physical media, and the protection group.

Class = 21

C-Type = 1

| CC_Type | CC_Media | PG_Type | (Reserved) |
|---|---|---|---|

CC_Type: 8 bits

The type of a control channel to be determined is indicated.
CC_Type=1, active
CC_Type=2, standby CC_Media The physical transmission characteristic of a control channel is indicated.

CC_Media=1, SONET section or SDH Regenerator Section
CC_Media=2, SONET line or SDH Multiplex Section
CC_Media=3, VC-11 or VC-12 SONET/SDH Timeslot
CC_Media=4, VC-3 SONET/SDH Timeslot
CC_Media=5, VC-4 SONET/SDH Timeslot
CC_Media=10, 10/100 Ethernet
CC_Media=15, Giga Ethernet
CC_Media=20, PoS
CC_Media=30, WDM
PG_Type
This indicates the type of protection group (PG-1/2/3) to which a control channel belongs.
PG_Type=1, PG-1
PG_Type=3, PG-3
PG_Type=21, DCC with PG-2
PG_Type=22, DCC with PG-3
Switchover Type
This object indicates the general information of the switchover, including its type and cause.

Class = 22

C-Type = 1

| SO_Type | Cause | (Reserved) | (Reserved) |

SO_Type: 8 bits

The switchover type is indicated.
SO_Type=1, automatic switchover
SO_Type=2, forced switchover
Cause: 8 bits
The switchover cause is indicated.
SO_Type=1, automatic switchover
Cause=1, ACC failed
SO_Type=2, forced switchover
Cause=1, operator request
Switchover ATTR
This object indicates the switchover attributes of an ACC or SCC.

Class = 23

C-Type = 1, ACC_SWITCHOVER_ATTR

C-Type = 2, SCC_SWITCHOVER_ATTR

| Local_CC_ID |
| Remote_CC_ID |
| Adjacent_Node_ID |
| CC_PROPERTY |

Local_CC_ID: 32 bits

A control channel identifier of a message transmission node is indicated.
Remote_CC_ID: 32 bits
A control channel identifier of a message reception node is indicated.
Adjacent_Node_ID: 32 bits
A node identifier to which a control channel is remotely connected is indicated.
CC_Property: refer to the above
ADDI INFO Indicator Class = 24

C-Type = 1

| Addi_Info_Indicator | (Reserved) |

Addi_Info_Indicator: 16 bits

This indicates the additional capabilities supported by the node sending this object.
Flag 1 (bit 1) set to 1 if the node supports the DCC configuration.
Flag 2 to Flag 16 set to 0 and reserved for future use.
Sequence Number

| Seq_No | (Reserved) | (Reserved) | (Reserved) |

Class = 25

C-Type = 1

Seq_No: 8 bits

The sequence number is used by the receiving node to distinguish between a message received for first time and a message that has already been received via other control channels. This number is coded in modular operation from 0 and 255. Note that any message is not used to reset the sequence number.
PROT Error Class = 27

C-Type = 1

| PE_Type | Cause | (Reserved) |

PE_Type: 8 bits

A protocol error type is indicated.
Type=0, undecided
Type=1, message header
Type=2, object header
Type=3, object content
Cause: 8 bits
Type=0, undefined
   Error_Code=0, undefined
Type=1, message header
   Cause=0, undefined
   Cause=1, undefined version
   Cause=2, undefined flag
   Cause=3, undefined message type
   Cause=4, message length error
Type=2, object header
   Cause=0, undefined
   Cause=1, undefined C-Type
   Cause=2, undefined Class
   Cause=3, message length error
   Cause=4, object order error
Type=3, object content
   Cause=0, undefined
   Cause=1, undefined ADDI_INFO_INDICATOR
   Cause=2, undefined CC_TYPE
   Cause=3, undefined CCID
   Cause=4, undefined CONFIG
   Cause=5, undefined HELLO
   Cause=6, undefined MESSAGE_ID Cause=7, undefined NODE_ID
Cause=8, undefined REJECT_CAUSE
Cause=9, undefined SEQUENCE_NUMBER
Cause=10, undefined SWITCHOVER_ATTR
Cause=11, undefined SWITCHOVER_TYPE
Reject Cause Class = 27

C-Type = 1

| RJ_Type | Cause | (Reserved) |
| --- | --- | --- |

RJ_Type: 8 bits

A rejected request type is indicated.
RJ_Type=0, undefined
RJ_Type=1, related to Config
RJ_Type=2, related to DCCconfig
RJ_Type=3, related to SAInqry
RJ_Type=4, related to Switchover
Cause: 8 bits
RJ_Type=0, undefined
   Cause=0, undefined
RJ_Type=1, related to Config
   Cause=0, undefined
RJ_Type=2, related to DCCconfig
   Cause=0, undefined
RJ_Type=3, related to SAInqry
   Cause=0, undefined
RJ_Type=4, related to Switchover
   Cause=0, undefined
   Cause=1, switchover completed FIGS. 12A through 17B are flowcharts illustrating the protocol for the constitution/protection of the automatic control channel based on the status definition, the event definition, the state transition, and the message definition shown in FIGS. 8, 9, 10, 11A and 11B.

FIGS. 12A through 12C and FIGS. 13A through 13B are flowcharts of a control channel identification method for PG-1/3 and detour route, a Hello, a protocol error, and a re-transmission in the Down, the Ready, and the Active states. FIGS. 14A through 14F are flowcharts of a protection/switchover property information inquiry, a Hello, a protocol error, a control channel unavailability notification, and automatic and forced switchovers in the Up state. FIGS. 15 through 16 are flowcharts of automatic and forced switchovers in the SoWaiting and Standby states. For a reference, from FIGS. 12A to 16 it is assumed that all ACCP messages do set the CCDown bit to zero.

FIG. 12A illustrates a flowchart of a transition from an Down state to a Ready state and a process after receiving events evConfDone and evConfErr; FIG. 12B illustrates a flowchart of a process after receiving events evCCDn, evNWTimer, evConf, evProtErr, and evConfRetTimer in the Ready state; FIG. 12C illustrates a flowchart of a process that the receiving node responds to the sending one from the step to identify its response type after receiving event evConf in the Ready state;

Referring to FIG. 12A, if the evBringUp event is received with regard to a resource which can be used as a control channel in the Down state, the Config message is generated and transmitted to a neighborhood node and waits for a response (Operations S1~S8 of FIG. 12A).

If the evConfDone event (issued as the receipt of ConfigAck message from the remote node) is received, it is determined if DCC setup needs to be applied. If the DCC setup is needed, the node starts a DCConfTimer. If the DCC setup is not needed, the node does not run any special action (Operations S9~S12 of FIG. 12A). Then it is checked if the type of the control channel is ACC or SCC. If the type of the control channel is ACC, the node runs the macro procedure of hello operation (refer to FIG. 17B) and changes the state of the control channel to the Active state (Operations S13~S16 of FIG. 12A). If the type of the control channel is SCC, the node changes the state of the control channel to the Standby state right away (Operations S13, S14, S17 of FIG. 12A).

If the evConfErr event (issued as the receipt of ConfigNack message from the remote node) is received, it is determined whether a negotiation is required. If needed, the node checks the negotiation rule, and then transmits the Config message its remote node again. There is no state transition and no more action in this case (Operations S18~S21 of FIG. 12A). However, if the negotiation between adjacent nodes is not needed, the node changes the state of control channel to the Down state (Operations S19, S20, S22~S24 of FIG. 12A).

Referring to FIG. 12B, if the evCCDn or evNWTimer event is received in the Ready state, the node does not run any special action and changes the state of control channel to the Down one (Operations S1~S2 of FIG. 12B).

If the evConf event (issued as the receipt of Config message from the remote node) is received in the Ready state, it is first determined that a NWTimer over this control channel is running (Operations S3~S4 of FIG. 12B). If the NWTimer is runnig, the node stops the NWTimer and checks the contention rule of Config (Operations S5~S7 of FIG. 12B). If the NWTimer is not running, the checks the contention rule of Config (Operations S5, S7 of FIG. 12B). If the node wins in the contention, there is no state transition and no more action (Operations S7~S9 of FIG. 12B). If the node looses in the contention, the node identifies a response type (Operations S7, S8, S10 of FIG. 12B).

If the evProtErr event is received in the Ready state, the local action is processed, but there is no state transition (Operations S11~S13 of FIG. 12B).

If the evConfRetTimer event is received in the Ready state, the node checks the Config retry counter of the control channel. If the counter exceeds the retrial limitation of Config, the node does not run any special action and changes the state of control channel to the Down one (Operations S14~S17 of FIG. 12B). However, if the counter does not still exceed the retrial limitation of Config, the node resends the message and increment the Config retry counter of the control channel by one. There is no state transition in this case (Operations S15, S16, S18~S20 of FIG. 12B).

Referring to FIG. 12C, if the node looses in the Config contention, the node identifies a response type to configuration request. If the response type is positive, the node checks if DCC setup should be supported between these adjacent nodes. Then, the node also checks if the type of the control channel is ACC or SCC (Operations S1~S3 of FIG. 12C). If the type of the control channel is ACC, the node transmits a ConfigAck message with ACC option to the remote node, and processes the macro procedure of hello operation (refer to FIG. 17B). Then, the node changes the state of the control channel to the Active state (Operations S4~S6 of FIG. 12C). If the type of the control channel is SCC, the node transmits a ConfigAck message with SCC option to the remote node. Then, the node changes the state of the control channel to the Standby state (Operations S4, S7~S9 of FIG. 12C). If the response type is negative against the configuration request, the node checks the negotiation status, and then transmits the ConfigNack message its remote node. Then if the negotiation between these nodes is not needed, the node changes the state of the control channel to the Down state (Operations S10~S13 of FIG. 12C). Otherwise, the node starts a NWTimer and keeps the state of the control channel as it is (Operations S12, S14~S15 of FIG. 12C).

FIGS. 13A illustrates a flowchart of a process after receiving events evCCDn, evHoldTimer, evHelloRcvd, evProtErr, and evSeqNumErr in the Active state; FIGS. 13B illustrates a flowchart of a process after receiving an event evHelloRetTimer in the Active state;

Referring to FIG. 13A, if the evCCDn event is received in the Active state, the node runs the macro procedure of switchover rule operation (refer to FIG. 17B). Then, the node changes the state of the control channel to the Down state (Operations S1~S4 of FIG. 13A).

If the evHoldTimer event is received in the Active state, the node stops HelloRetTimer, and runs the macro procedure of switchover rule operation (refer to FIG. 17B). Then, the node changes the state of the control channel to the Down state (Operations S1, S5~S6, S3~S4 of FIG. 13A).

If the evHelloRcvd event is received in the Active state, the node restarts HoldTimer, and changes the state of the control channel to the Up state (Operations S7~S9 of FIG. 13A).

If the evProtErr or evSeqNumErr event is received in the Active state, the local action is processed, but there is no state transition (Operations S10~S12 of FIG. 13A).

If the evHelloRetTimer event is received in the Active state, the node checks the Hello retry counter of the control channel. If the counter exceeds the retrial limitation of Hello, then, the node stops HoldTimer, and runs the macro procedure of switchover rule operation (refer to FIG. 17B). Then, the node changes the state of the control channel to the Down state (Operations S1~S6 of FIG. 13B). However, if the counter does not still exceed the retrial limitation of Hello, the node resends the Hello message and increment the Hello retry counter of the control channel by one. There is no state transition in this case (Operations S2~S3, S7~S9 of FIG. 13B).

FIG. 14A illustrates a flowchart of a process after receiving events evInqryDone, evInqryErr, evInqryReq, evInqry, and evNotiReq in the Up state; FIGS. 14B through 14E illustrate flowcharts of a process after receiving events evCCDn, evProtErr, evSeqNumErr, evHelloRcvd, and evHelloRetTimer, evNoti, evDCConf, evDCConfDone, evDCConfErr, evDCConfTimer, evDCConf2Timer, and evSoCompleted in the Up state;

Referring to FIG. 14A, if the evInqryDone or evSoAttrConf event is received in the Up state, the node sends the result of switchover attributes request to its local user. In this case, there is no state transition (Operations Sx1~S4 of FIG. 14A).

If the evInqryReq event is received in the Up state from its local user, the node sends the SAInaqry message to its remote node. There is also no state transition (Operations S1, S5~S6, S4 of FIG. 14A).

If the evInqry event (issued as the receipt of SAInaqry message from the remote node) is received in the Up state, the node checks its protection and switchover table, and identifies a response type to attributes request. If the response type is positive, the node sends the SAInaqryAck message to its remote node. There is no state transition (Operations S7~S11, S4 of FIG. 14A). But if the response type is negative, the node sends the SAInaqryNack message to its remote node. There is no state transition (Operations S10, S12, S4 of FIG. 14A).

If the evNotiReq event (issued as there is no any control channel available) is received in the Up state, the node sends the Notify message to its preceding node. There is no state transition (Operations S13~S14, S4 of FIG. 14A).

Figure 14B:
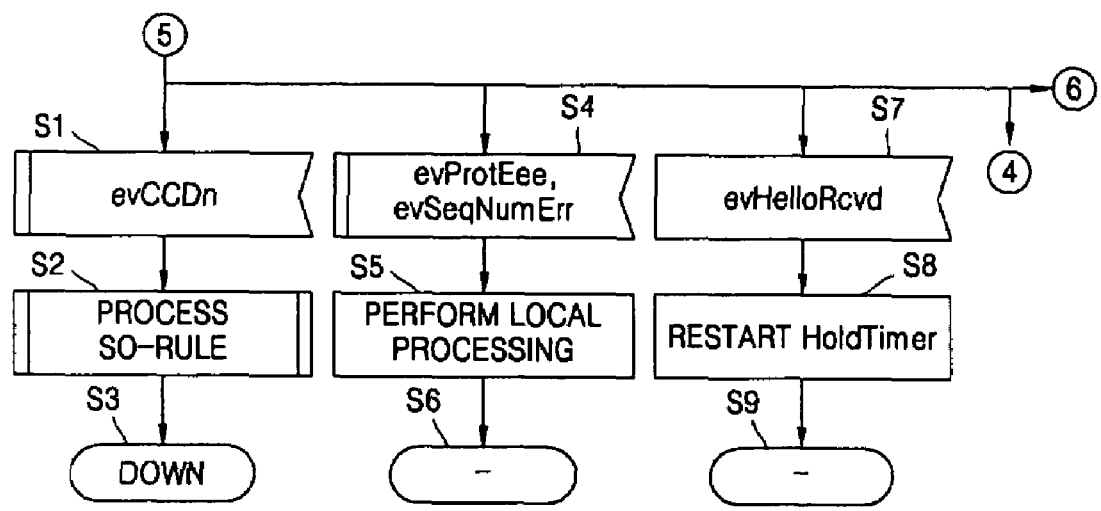

Referring to FIG. 14B, if the evCCDn event is received in the Up state, the node runs the macro procedure of switchover rule operation (refer to FIG. 17B). Then, the node changes the state of the control channel to the Down state (Operations S1~S3 of FIG. 14B).

If the evProtErr or evSeqNumErr event is received in the Up state, the local action is processed, but there is no state transition (Operations S4~S6 of FIG. 14B).

If the evHelloRcvd event is received in the Up state, the node restarts HoldTimer. There is also no state transition (Operations S7~S9 of FIG. 14B).

If the evHelloRetTimer event is received in the Up state, the action is the same to the situation of the receipt of evHelloRetTimer event in the Active state (Operations S1~S6 of FIG. 13B, or operations S2~S3, S7~S9 of FIG. 13B).

Figure 14C:
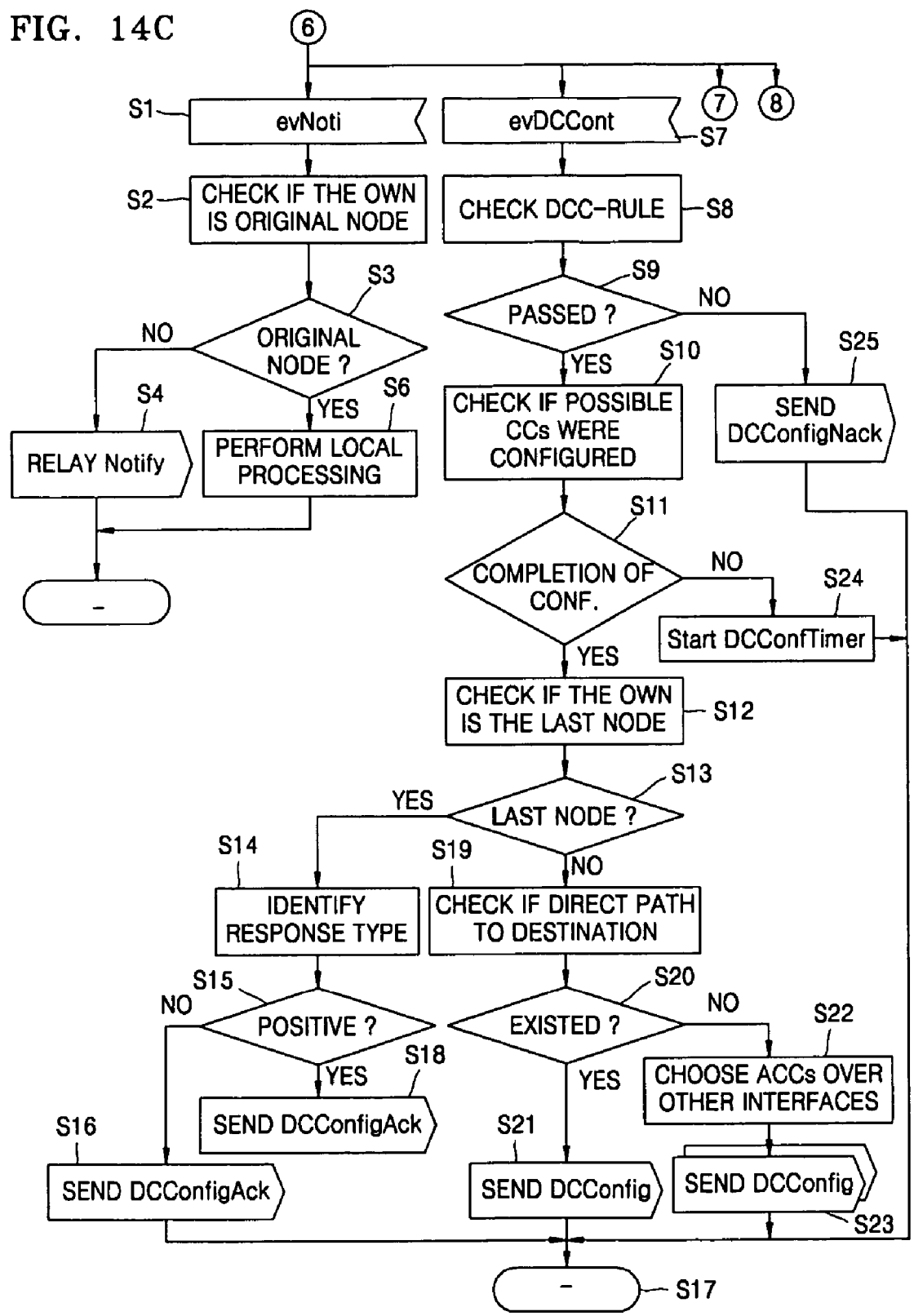

Referring to FIG. 14C, if the evNoti event (issued as the receipt of Notify message from its succeeding node) is received in the Up state, the node checks if the own is original node or not. If the own is the original node for the event, the node runs a local action. There is no state transition (Operations S1~S5 of FIG. 14C). If the own is not the original node for the event, the node relay the message Notify towards its original node. There is also no state transition (Operations S3, S6, S5 of FIG. 14C).

If the evDCConf event (issued as the receipt of DCConfig message from the preceding node) is received in the Up state, the node checks the DCC rule. If the result of checking the DCC rule is passed, the node checks if possible control channels would be configured. If they were configured, then the node checks if the own is the last succeeding node for detour route between two adjacent nodes. If the own is the last node, the node identifies a response type to DCC setup request. If the response type is positive, the node sends the DCConfigAck message to its last remote node, and does not change the state of the control channel (Operations S7~S17 of FIG. 14C). But if the response type is negative, the node sends the DCConfigNack message to its last preceding node. There is also no state transition (Operations S15, S18, S17 of FIG. 14C). If the own is not the last node, the node checks if there is a direct path to the last succeeding node. If the node has the direct path, the node sends DCConfig message to the last succeeding node, and does not change the state of the control channel (Operations S13, S19~S21, S17 of FIG. 14C). If the node has still not the direct path towards the last succeeding node, the node chooses possible ACCs over other interfaces. Then, the node multicast the DCConfig messages via its ACCs towards the last succeeding node (Operations S20, S22~S23, S17 of FIG. 14C). If possible control channels would not be configured to send the DCConfig message towards the last succeeding node, the node starts DCConfTimer to be capable of being invoked after the configuration of other control channel is completed, and does not change the state of the control channel (Operations S11, S24, S17 of FIG. 14C). If the result of checking the DCC rule is not passed, the node sends the DCConfigAck message towards its last preceding node, but does not change the state of the control channel (Operations S9, S25, S17 of FIG. 14C).

Figure 14D:
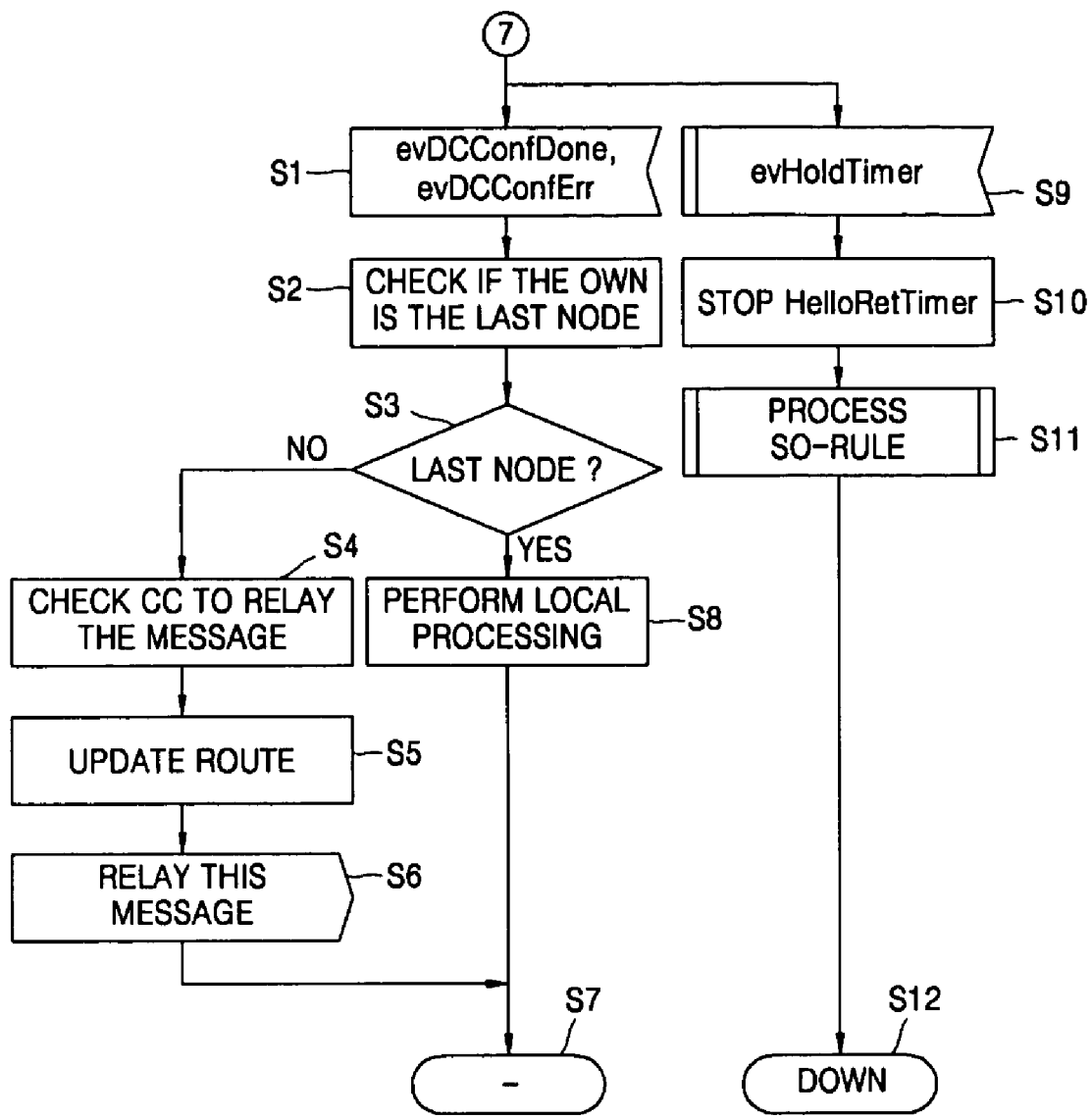

Referring to FIG. 14D, if the evDCConfDone or evDCConfErr event (issued as the receipt of DCConfigAck or DCConfigNack message from its succeeding node) is received in the Up state, the node checks if the own is the last node for detour route between two adjacent nodes. If the own is the last preceding node, the node performs a local action, but does not change the state of the control channel (Operations S1~S7 of FIG. 14D). If the own is not the last preceding node, the node checks a control channel to relay the message received, updates the route to relay packets at the level of IP layer (not ACCP layer) between two adjacent nodes, and relay the message received towards the last preceding node, but does not change the state of the control channel (Operations S3, S8, S7 of FIG. 14D).

If the evHoldTimer event is received in the Up state, the node stops HelloRetTimer, and runs the macro procedure of switchover rule operation (refer to FIG. 17B). Then, the node changes the state of the control channel to the Down state (Operations S9~S12 of FIG. 14D).

Figure 14E:
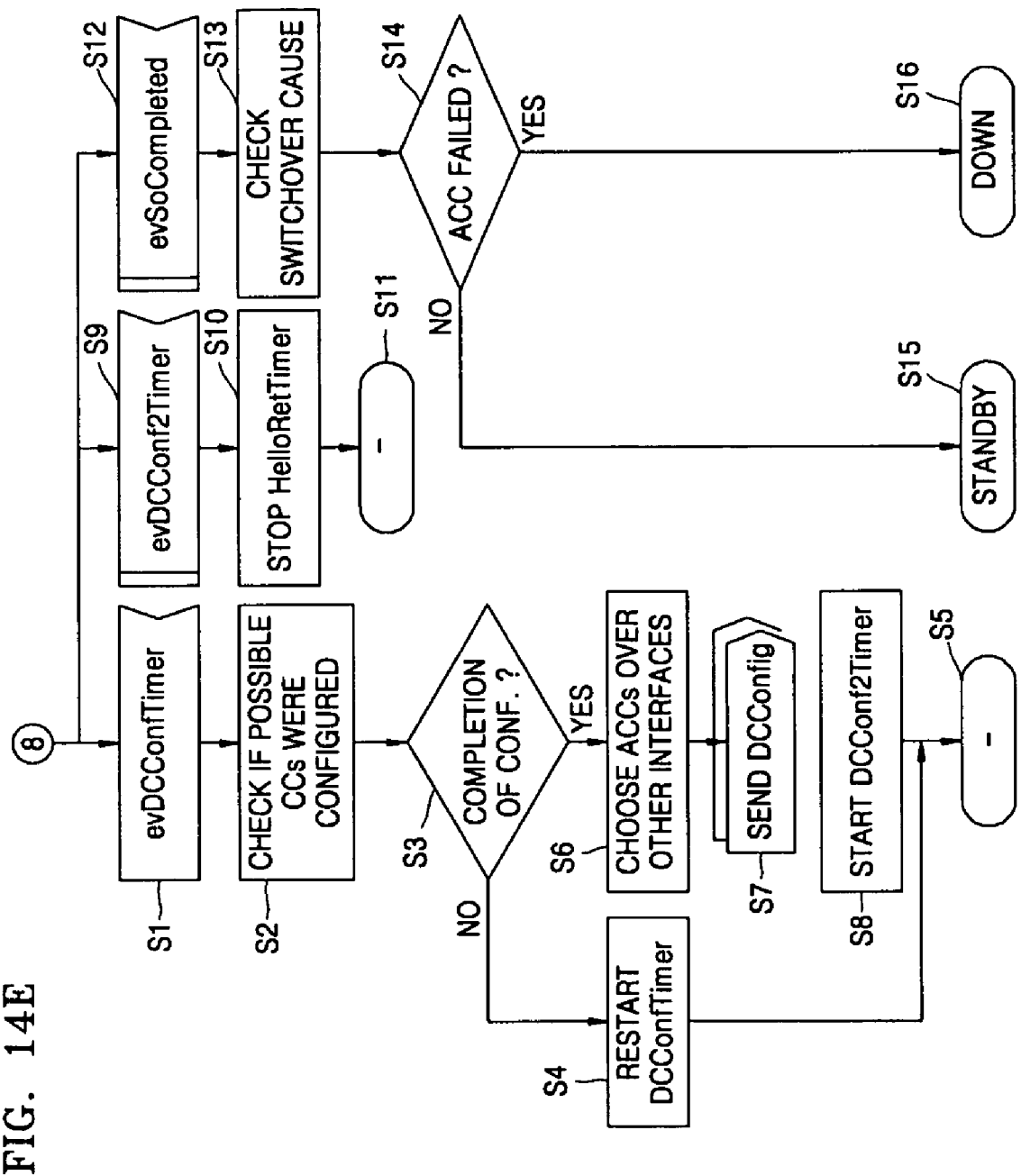

Referring to FIG. 14E, if the evDCConfTimer is received in the Up state, the node checks if possible control channels would be configured. If they were configured, the node chooses possible ACCs over other interfaces. Then, the node multicast the DCConfig messages via its ACCs towards the last succeeding node, starts DCConf2Timer, but does not change the state of the control channel (Operations S1~S5 of FIG. 14E). If they would not be configured, the node restarts DCConfTimer, and keeps the state of the control channel unchanged (Operations S3, S6~S8, S5 of FIG. 14E).

If the evDCConf2Timer event is received in the Up state, the node performs a local action, and keeps the state of the control channel unchanged (Operations S9~S11 of FIG. 14E).

If the evSoCompleted event is received in the Up state, the node checks the switchover cause. If the cause is due to an ACC failure, the node changes the state of the control channel to the Down state (Operations S12~S15 of FIG. 14E). And, if not so, changes the state of the control channel to the Standby state (Operations S14, S16 of FIG. 14E).

FIG. 15 illustrates a flowchart of a process after receiving events evSoDone, evSo, evCCDn, and evProtErr in the SoWaiting state;

Referring to FIG. 15, if the evSoDone event (issued as the receipt of SoAck message from its remote node) is received in the SoWaiting state, the node stops SoTimer, and runs the macro procedure of hello operation (refer to FIG. 17B) and sends the evSoCompleted event to the own, and changes the state of the control channel to the Active (Operations S1~S6 of FIG. 15).

If the evSo event (issued as the receipt of Switchover message from its remote node) is received in the SoWaiting state, the node checks if the own switchover was requested or not to the remote node. If the own switchover was requested, the node checks the contention rule of Switchover. If the node wins in the contention, there is no state transition and no more action (Operations S7~S9, S14 of FIG. 15). If the node looses in the contention, the node finds an ACC needed for the switchover request, and identifies a response type to switchover request (Operations S9~S10 of FIG. 15). If the response type is positive, the node sends the SwitchoverAck message to its remote node, runs the macro procedure of hello operation (refer to FIG. 17B), sends the evSoCompleted event to the own, and changes the state of the control channel to the Active (Operations S11~S12, S4~S6 of FIG. 15). But, if the response type is negative, the node sends the SwitchoverNack message to its remote node, and keeps the state of the control channel unchanged (Operations S11, S13~S14 of FIG. 15).

If the evCCDn event is received in the SoWaiting state, the node changes the state of the control channel to the Down state (Operations S15~S16 of FIG. 15).

If the evProtErr is received in the SoWaiting state, the local action is processed, but there is no state transition (Operations S17~S18, S14 of FIG. 15).

If the evSoTimer event is received in the SoWaiting state, the node runs a local action, and changes the state of the control channel to the Standby (Operations S19~S21 of FIG. 15).

If the evSoErr event (issued as the receipt of SoNack message from its remote node) is received in the SoWaiting state, the node stops SoTimer, and also changes the state of the control channel to the Standby (Operations S22~S23, S21 of FIG. 15).

FIG. 16 illustrates a flowchart of a process after receiving events evCCDn, evSo, evSoReq, and evProtErr in the Standby state;

Referring to FIG. 16, if the evCCDn event is received in the Standby state, the node changes the state of the control channel to the Down state (Operations S1~S3 of FIG. 16).

If the evSo event (issued as the receipt of Switchover message from its remote node) is received in the Standby state, the node identifies a response type to switchover request (Operations S1, S4~S5 of FIG. 16). If the response type is positive, the node sends the SwitchoverAck message to its remote node, runs the macro procedure of hello operation (refer to FIG. 17B), sends the evSoCompleted event to the own, and changes the state of the control channel to the Active (Operations S6~S10 of FIG. 15). But, if the response type is negative, the node sends the SwitchoverNack message to its remote node, and keeps the state of the control channel unchanged (Operations S6, S11~S12 of FIG. 16).

If the evSoReq event is received in the Standby state, the node sends the Switchover message to its remote node, and starts SoTimer. Then, the node changes the state of the control channel to the SoWaiting state (Operations S13~S16 of FIG. 16).

If the evProtErr is received in the Standby state, the local action is processed, but there is no state transition (Operations S17~S19 of FIG. 16).

FIG. 17A illustrates a flowchart of a process after receiving an event evAdminDown in all states except the Down state; and illustrates a flowchart of a process after receiving an event evDownTimer or after receiving all ACCP messages with the CCDown bit set in the GoingDown state; and FIG. 17B illustrate flowcharts of macro procedures of switchover rule and hello operations that could be used in other all flowcharts except for these flowcharts;

Referring to FIG. 17A, if the evAdminDown event is received in all states except the Down state, the node does set the CCDown bit to '1', and starts DownTimer. Then, the node changes the state of the control channel to the GoingDown state (Operations S1~S5 of FIG. 17A).

If the evDownTimer event is received in the GoingDown state, the nodes changes the state of the control channel to the Down state (Operations S6~S8 of FIG. 17A).

If the relevant events (issued as the receipt of all ACCP message with CCDown bit set from its remote node) is received in the GoingDown state, the nodes stops DownTimer, and changes the state of the control channel to the Down state (Operations S6, S9~S10, S8 of FIG. 17A).

Referring to FIG. 17B, in case of the macro procedure of switchover rule, the node checks if SCCs against the current ACC are existed. If SCCs are existed, the node sends as evSoReq events as the number of SCCs to the own node locally (Operations S1~S4 of FIG. 17B). If any SCC is existed no more, the node declares "Degraded State" about the control relationship between adjacent nodes. Then the nodes checks if there are nodes that want to be notified the situation. If there are one or more such a node, the node sends as evNotiReqs event as the number of nodes to the own node locally (Operations S3, S5~S8 of FIG. 17B). If there is not such a node, the node has no more action (Operations S3, S5~S7 of FIG. 17B).

In case of the macro procedure of hello, the node sends the Hello message, starts HelloRetTimer and HoldTimer, and increments helloRetry by one (Operations S9~S13 of FIG. 17B).

It is possible for the present invention to be realized on a computer-readable recording medium as a computer-readable code. Computer-readable recording media include every kind of recording device that stores computer system-readable data. ROMs, RAMs, CD-ROMs, magnetic tapes, floppy discs, optical data storage, etc. are used as a computer-readable recording media. Computer-readable recording media can also be realized in the form of a carrier wave (e.g., transmission through Internet). A computer-readable recording medium is dispersed in a computer network, and is stored and executed as a computer-readable code by a dispersion method.

According to the present invention, this provides a protection mechanism of control channels without additional overhead and with higher level of resilience capability to improve shortcomings of the LMP and MPLS based schemes. The present invention uses the current LMP as a basis and applies to the scheme the concept of common channel signaling (e.g., to configure various paths to exchange control packets between adjacent nodes using associated, quasi-associated and non-associated modes defined by ITU-T).

To be more specific, this present invention applies three PGs, the PG-1 in which control channels are directly connected between adjacent nodes, the PG-2 in which control channels are indirectly connected between adjacent nodes according to a predefined route, and the PG-3 in which control channels are connected via an internal or external IP network. The present invention uses multicast scheme for a reliable switchover, and provides services of a control network until direct and indirect control channels of 2L ('L' means the number of directly-connected links between adjacent nodes) suffer from failures if a PG-3 control channel is additionally kept. And the present invention applies that detour control channels over a detour route between adjacent nodes do not use additional control channels, but use the current active control channel between directly connected nodes.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of constituting and protecting a control channel in an Internet Protocol (IP)-based network, the method comprising:
    (a) allowing two adjacent nodes to configure a communication environment of protection group (PG)-1 and PG-3 control channels, and to identify an active and one or more standby control channels between two adjacent nodes;
    (b) to configure a more powerful control network after the identification of PG-1 and PG-3 control channels, establishing a detour control channel using PG-1 or PG-3 control channels over one or more transit nodes between adjacent nodes;
    (c) when a failure on an Active Control Channel (ACC) in use occurs, sending a switchover request on each of the one or more standby control channels and the detour control channel; and
    (d) performing a switchover to the standby or detour control channel that first responds to the switchover requests sent to in response to the failure.

2. The method of claim 1, wherein operation (a) comprises:
    (a1) transmitting a control channel identification message including a control channel property and an additional information indicator to a destination node to identify control channels of the PG-1 and PG-3 from a originating node;
    (a2) receiving the control channel identification message in the destination node;
    (a3) determining the active and standby control channels;
    (a4) determining if Detour Control Channel (DCC) setup should be supported; and
    (a5) transmitting a response message including the control channel property to the originating node.

3. The method of claim 1, wherein operation (b) comprises:
    (b1) transmitting detour control channel identification messages including an originating identifier, a destination node identifier, and one or more relay node identifiers from an originating node to one or more relay nodes interposed between a originating node and the destination node;
    (b2) transmitting the detour control channel identification message to the destination node via a plurality of the relay nodes; and
    (b3) transmitting a response message including the originating and destination node identifiers and a list of relay nodes from the destination node to the originating node through the relay nodes in response to a first received detour control channel identification message.

4. The method of claim 1, wherein operation (c) comprises:
    (c1) transmitting one or more switchover messages including a local control channel identifier, a local node identifier, a sequence number, and a switchover type to a destination node through all Standby Control Channels (SCC) from the originating node;
    (c2) receiving one or more switchover message in the destination node, and determining a new active control channel; and
    (c3) transmitting a response message including local and remote control channel identifiers, local and remote node identifiers, and a sequence number to an originating node.

5. The method of claim 1, further comprising: (d) if the control channel having the failure is recovered, verifying connections with regard to the recovered control channel.

6. The method of claim 1, further comprising: (e) performing a forced switchover to a specific standby control channel via an operator's request.

7. The method of claim 1, further comprising: (f) when errors occur in every control channel between two adjacent nodes, notifying to a node previous to the node where errors occurred that there are no available control channels.

8. The method of claim 1, wherein operation (c) comprises:
    (c1) transmitting a switchover attributes messages to a destination node through an ACC from an originating node;
    (c2) receiving the switchover attributes message in the destination node, and identifying the switchover attributes of an ACC and one or more SCCs; and
    (c3) transmitting a response message including the switchover attributes of an ACC and one or more SCCs to the originating node.

9. The method of claim 1, further comprising: (h) performing a "Hello" function of a link management protocol as a necessary operation for a control channel to be an ACC.

10. The method of claim 1, further comprising: (i) when a protocol error occurs in a message received, notifying the originating node of the protocol error.

11. The method of claim 1, wherein an originating node includes a Down state where there is no attempt to use a control channel, a Ready state where a constitution and correlation of the control channel are determined, an Active state where periodically sends a Hello message to designate an ACC, an Up state where control packets such as signaling and routing protocols are exchanged using the control channel, a Standby state where the control channel waits for a conversion to the active control channel for exchanging control packets, a SoWaiting state where the control channel waits for a response after requesting the switchover for the conversion of the active control channel, and a GoingDown state where the control channel is no longer used based on an administrative action.

12. A status transition method for constituting and protecting a control channel, the method comprising:

(a) transmitting a control channel identification message in a Down state that is an initial status and transiting to a Ready state;

(b) receiving a response message in response to the control channel identification message, transmitting one or more hello messages in a Ready state and transiting to an Active state for designating an Active Control Channel (ACC);

(c) receiving one hello message in the Active state and transiting to an Up state for exchanging control packets for exchanging control according to a protection/switchover function and a type of the control channel based on the response message;

(d) when an event that the control channel is no longer available in the Active state or the Up state occurs, transmitting multiple switchover messages to one or more Standby Control Channels (SCCs) and Detour Control Channel (DCC) and transiting to the Down state; and (e) performing a switchover to the standby or detour control channel that first responds to the switchover messages sent in response to the event.

13. The method of claim 12, wherein operation (b) comprises: if the type of the control channel based on the response message is a standby control channel, transiting to a Standby state where the control channel waits for a conversion to an active control channel.

14. The method of claim 13, further comprising: (e) receiving a switchover message in the Standby state, transmitting a response message of the switchover request and one or more hello messages, and transiting to a SoWaiting state.

15. The method of claim 13, further comprising: (f) if an unavailability event of the control channel or a switchover request event by an operator occurs in the Standby state, transmitting the switchover message using multicast or unicast respectively, and transiting to the SoWaiting state where the control channel waits for a response.

16. The method of claim 15, further comprising: (g) receiving an agreement message to the switchover request message in the Sowaiting state, transmitting one or more hello messages, and transiting to the Active state.

17. The method of claim 12, further comprising: (h) if an event indicating that a control channel is not available or a negotiation waiting timer expires occurs in the Ready state, transiting to the Down state.

18. The method of claim 12, further comprising: (i) if the control channel identification message is received in the Ready state, transiting to one of the Down state, the Standby state, and the Active state based on the type of a control channel corresponding to the control channel identification message and whether the protection/switchover function is applied.

* * * * *